(12) United States Patent
Fassio et al.

(10) Patent No.: US 8,341,089 B2
(45) Date of Patent: Dec. 25, 2012

(54) REAL ESTATE MANAGEMENT SYSTEM AND METHOD

(75) Inventors: James S. Fassio, Pleasanton, CA (US); David C. Jones, Sandy, UT (US); Gary D. Scott, Pleasanton, CA (US); Glen Boyer, Pleasanton, CA (US); Charlene Iverson, Pleasanton, CA (US); Larry Haller, Pleasanton, CA (US)

(73) Assignee: Ross Stores, Inc., Pleasanton, CA (US)

( * ) Notice: Subject to any disclaimer, the term of this patent is extended or adjusted under 35 U.S.C. 154(b) by 0 days.

(21) Appl. No.: 11/947,676

(22) Filed: Nov. 29, 2007

(65) Prior Publication Data

US 2009/0144097 A1 Jun. 4, 2009

(51) Int. Cl.
*G06Q 50/00* (2012.01)
(52) U.S. Cl. .................. 705/313; 705/314; 705/315
(58) Field of Classification Search .............. 705/1, 7.34
See application file for complete search history.

(56) References Cited

U.S. PATENT DOCUMENTS

| | | | | |
|---|---|---|---|---|
| 6,897,763 | B2 * | 5/2005 | Schulmerich et al. ....... | 340/5.91 |
| 7,024,397 | B1 * | 4/2006 | Donahue ........................ | 705/80 |
| 7,130,810 | B2 * | 10/2006 | Foster et al. ................... | 705/10 |
| 7,440,921 | B1 * | 10/2008 | Rieger et al. .................. | 705/38 |
| 2001/0037273 | A1 * | 11/2001 | Greenlee, Jr. ................. | 705/35 |
| 2002/0062277 | A1 * | 5/2002 | Foster et al. ................... | 705/38 |
| 2003/0229549 | A1 * | 12/2003 | Wolinsky et al. .............. | 705/27 |
| 2004/0030616 | A1 * | 2/2004 | Florance et al. ............... | 705/27 |
| 2006/0129482 | A1 * | 6/2006 | Etzkorn ......................... | 705/39 |
| 2006/0173707 | A1 * | 8/2006 | Schubert et al. ................ | 705/1 |
| 2007/0203840 | A1 * | 8/2007 | Liu ................................ | 705/51 |
| 2008/0052247 | A1 * | 2/2008 | Walker .......................... | 705/80 |
| 2008/0077490 | A1 * | 3/2008 | Wolf et al. ..................... | 705/14 |
| 2009/0099890 | A1 * | 4/2009 | Ash ................................ | 705/7 |

OTHER PUBLICATIONS

PCT/US08/85018 International Search Report, dated Dec. 22, 2008.
PCT/US08/85018 Written Opinion, dated Dec. 22, 2008.

* cited by examiner

*Primary Examiner* — Matthew T Sittner
(74) *Attorney, Agent, or Firm* — DLA Piper LLP (US)

(57) ABSTRACT

A real estate management system and method are provided. The system and method provide an integrated system that handles all of the aspects of a piece of property including identification, acquisition, development (design and construction), management, maintenance and disposal. The system may include a five year plan, a sign package, a lease wizard and a work orders module.

7 Claims, 42 Drawing Sheets

| Potential Sites Pending Approval | | | | | | |
|---|---|---|---|---|---|---|
| Site Name | City | ST | Market Research | Deal Maker | Added By | Add Date |
| Bay Hill Orlando | Orlando | FL | ☑ | ☐ | JDUPELL | 03/29/2006 |
| Bloomingdale/ SE Brandon | Brandon | FL | ☑ | ☐ | | / / |
| Branden's Test Emporium | Draper | UT | ☐ | ☐ | ADMIN | 09/21/2006 |
| Palm Bay | Palm Bay | FL | ☑ | ☐ | | / / |
| Sarasota North | Sarasota | FL | ☑ | ☐ | | / / |

User Change Log — 150

Store No: _____  Site Name: _____  [Search] [Reset Filters] [Print]

Changed From: 01/01/2006  Thru: 07/17/2007  [View Detail]  999 Record(s)

User Name: _____  [Next] [Prev]  [Close]

152

| Store | Site Name | User | Old Value | New Value | Change Date | Table Name | Field Name | |
|---|---|---|---|---|---|---|---|---|
| 1091 | Howell Mill | David Bimbre | Going into Loop. | DBIRNBRE 09/23/2005 | 09/21/2006 02:05:48 | COMPET | NOTES | Notes - Misc |
| 1091 | Howell Mill | David Bimbre | 10/10/2005 12:00:00 AM | / / : : AM | 09/21/2006 02:05:48 | COMPET | PT_OPENED | Open Date - |
| 1091 | Howell Mill | David Bimbre | 30000 | 33188 | 09/21/2006 02:05:48 | COMPET | SQFOOTAGE | Square Foot |
| 1091 | Howell Mill | David Bimbre | 130 | | 09/21/2006 02:05:48 | COMPET | PROP_ID | Property ID |
| 1078 | Conyers | David Bimbre | 98444 | 127276 | 09/21/2006 02:04:43 | COTENANT | SQFOOTAGE | Square foot |
| 1078 | Conyers | David Bimbre | 03/13/2007 | 10/10/2006 | 09/21/2006 02:04:24 | SITES | SOFTOPEN | Soft opening |
| 1078 | Conyers | David Bimbre | 30094 | 30013-2029 | 09/21/2006 02:04:24 | SITES | P_ZIP | Zip code of |
| 1078 | Conyers | David Bimb | 2007 | 2006 | 09/21/2006 02:04 | SITES | OPENYEAR | Open Year |
| 1078 | Conyers | David Bimbre | 2007 | 2006 | 09/21/2006 02:04:13 | COTENANT | OPENYEAR | Year the Co |
| 1078 | Conyers | David Bimbre | 35000 | 39755 | 09/21/2006 02:04:13 | COTENANT | SQFOOTAGE | Square foota |
| 0870 | Evans | David Bimbre | 07/11/2006 | 07/08/2006 | 09/21/2006 01:55:10 | SITES | SOFTOPEN | Soft opening |
| 0870 | Evans | David Bimbre | 30907 | 30809-3069 | 09/21/2006 01:55:10 | SITES | P_ZIP | Zip code of |
| 0870 | Evans | David Bimbre | SEC Washington Road & 0 | 4215 Washington Road | 09/21/2006 01:55:02 | SITES | P_ADDRESS | Address line |
| 0870 | Evans | David Bimbre | | 2006 | | COTENANT | OPENYEAR | Year the Co |

ROSS
DRESS FOR LESS

Five Year Plan
New Sites By City

*SiteLink*

| State | City | 2008 | 2009 | 2010 | 2011 | 2012 | Grand Total |
|---|---|---|---|---|---|---|---|
| | Humacao | 0 | 0 | 0 | 1 | 0 | 1 |
| | – Total | 0 | 0 | 0 | 1 | 0 | 1 |
| AL | Birmingham | 0 | 0 | 0 | 1 | 0 | 1 |
| | Decatur | 0 | 1 | 1 | 0 | 0 | 1 |
| | Florence | 1 | 0 | 0 | 0 | 0 | 1 |
| | Fultondale | 1 | 0 | 0 | 0 | 0 | 1 |
| | Gadsden | 0 | 0 | 1 | 0 | 0 | 1 |
| | Homewood | 0 | 0 | 0 | 0 | 0 | 0 |
| | Madison | 1 | 0 | 0 | 0 | 0 | 1 |
| | Mobile | 1 | 0 | 0 | 0 | 0 | 1 |
| | Orange Beach | 0 | 0 | 0 | 0 | 0 | 1 |
| | Prattville | 0 | 1 | 0 | 0 | 0 | 1 |
| | Trussville | 0 | 0 | 0 | 0 | 0 | 1 |
| | Tuscaloosa | 1 | 0 | 0 | 0 | 0 | 1 |
| | AL – Total | 5 | 2 | 3 | 1 | 0 | 11 |
| AR | Conway | 0 | 0 | 1 | 0 | 0 | 1 |
| | Fayetteville | 0 | 0 | 0 | 1 | 0 | 1 |
| | Fort Smith | 0 | 0 | 1 | 0 | 0 | 1 |
| | Hot Springs | 0 | 0 | 0 | 1 | 0 | 1 |
| | Jonesboro | 0 | 0 | 1 | 0 | 0 | 1 |
| | Little Rock | 0 | 0 | 0 | 1 | 0 | 1 |
| | North Little Rock | 0 | 0 | 0 | 0 | 1 | 1 |
| | Pine Bluff | 0 | 0 | 1 | 0 | 0 | 1 |
| | Rogers | 0 | 0 | 0 | 0 | 1 | 1 |
| | AR – Total | 0 | 0 | 4 | 4 | 1 | 9 |
| AZ | Apache Junction | 0 | 0 | 0 | 0 | 1 | 1 |
| | Buckeye | 1 | 0 | 0 | 0 | 1 | 2 |
| | Bullhead City | 1 | 0 | 0 | 0 | 0 | 1 |
| | Cottonwood | 0 | 0 | 0 | 0 | 1 | 1 |
| | Gilbert | 0 | 0 | 0 | 0 | 0 | 1 |
| | Lake Havasu | 1 | 0 | 0 | 0 | 1 | 1 |

Welcome David Jones

Site(s) Listed: 27
Total Site(s): 2586

| Store | Site Name | City | State |
|---|---|---|---|

| Status | Concept | DMA | Broker |
|---|---|---|---|
| View All | View All | View All | Alan Tanner |

[Search] [Print] [Reset] [Add] [Summary]

| Store | Site Name | Intersection | City | DMA | State | Year | Status |
|---|---|---|---|---|---|---|---|
| 0085 | Tucson | BROADWAY & KOLB RD | Tucson | Tucson (Nogales), AZ | AZ | 1985 | OPEN |
| 0086 | N. Tucson | NWC N. ORACLE & W. WETMORE | Tucson | Tucson (Nogales), AZ | AZ | 1985 | OPEN |
| 0398 | Foothills Mall | LA CHOLLA BLVD & INA RD | Tucson | Tucson (Nogales), AZ | AZ | 1997 | OPEN |
| 0544 | SW Tucson | SWC I-19 & W IRVINGTON RD | Tucson | Tucson (Nogales), AZ | AZ | 2001 | OPEN |
| 0574 | Oro Valley | SWC ORACLE RD & N FIRST AVE | Oro Valley | Tucson (Nogales), AZ | AZ | 2002 | OPEN |
| 0640 | Nogales | NEC MARIPOSA RD & CONGRESS DR | Nogales | Tucson (Nogales), AZ | AZ | 2003 | OPEN |
| 0824 | Sierra Vista | NEC Highway 90 & Charleston Rd | Sierra Vista | Tucson (Nogales), AZ | AZ | 2004 | OPEN |
| 0888 | SE Tucson | SEC Harrison Road & 22nd Street | Tucson | Tucson (Nogales), AZ | AZ | 2005 | OPEN |
| 0999 | Tucson El Con | NWC Broadway Blvd & Dodge Blvd | Tucson | Tucson (Nogales), AZ | AZ | 2007 | REC |
| 1144 | Casa Grande | NEC Interstate 10 & Florence Boulevard | Casa Grande | Phoenix, AZ | AZ | 2008 | REC |
| 1152 | NE Tucson | SEC Grant Road & Crayoroft Road | Tucson | Tucson (Nogales), AZ | AZ | 2007 | REC |
| 1274 | Marana | SWC Interstate 10 & Cortaro | Marana | Tucson (Nogales), AZ | AZ | 2009 | REC |

| Store Number | Site Location | Impact Percent | Impact Amount | Projected Sales | Year |
|---|---|---|---|---|---|
| 163 | Clovis | 14.0% | 671K | 4,877K | 2006 |
| 467 | North Fresno | 3.4% | 291K | 8,527K | 2006 |
| 5003 | New Concept Clovis | 3.1% | 138K | 4,462K | 2006 |

Total: 1,100K

Store Number: 5003
Site Name: New Concept Clovis

Projected Sales: 4,462K
For Year: 2006

Impact Percent: 3.1%
Impact Amount: 138K

FIGURE 13

| Store No | Site Name | City | DMA | ST | Open Yr | Status |
|---|---|---|---|---|---|---|
| 0099 | Las Vegas | Las Vegas | Las Vegas, NV | NV | 1985 | 01 - Open |
| 0112 | West Las Vegas | Las Vegas | Las Vegas, NV | NV | 1986 | 01 - Open |
| 0223 | E. Las Vegas | Las Vegas | Las Vegas, NV | NV | 1991 | 01 - Open |
| 0236 | Green Valley | Henderson | Las Vegas, NV | NV | 1991 | 01 - Open |
| 0245 | N. W. Las Vegas | Las Vegas | Las Vegas, NV | NV | 1992 | 01 - Open |
| 0424 | South Las Vegas | Las Vegas | Las Vegas, NV | NV | 1998 | 01 - Open |
| 0522 | Boca Park | Las Vegas | Las Vegas, NV | NV | 2001 | 01 - Open |
| 0542 | Centennial Hills, Las Vegas | Las Vegas | Las Vegas, NV | NV | 2001 | 01 - Open |
| 0679 | Las Vegas Strip | Las Vegas | Las Vegas, NV | NV | 2004 | 01 - Open |
| 0703 | Spring Valley | Las Vegas | Las Vegas, NV | NV | 2003 | 01 - Open |
| 1036 | Blue Diamond / LV | Las Vegas | Las Vegas, NV | NV | 2006 | 01 - Open |
| 1061 | North Las Vegas | North Las Vegas | Las Vegas, NV | NV | 2007 | 02 - REC Approved |
| 1114 | Las Vegas Station | North Las Vegas | Las Vegas, NV | NV | 2020 | 02 - REC Approved |
| 1115 | Las Vegas McCarran | Las Vegas | Las Vegas, NV | NV | 2007 | 02 - REC Approved |
| 1123 | Southern Beltway | North Las Vegas | Las Vegas, NV | NV | 2008 | 02 - REC Approved |
| 1272 | Deer Springs | Henderson | Las Vegas, NV | NV | 2008 | 02 - REC Approved |
| | Central Henderson | Henderson | Las Vegas, NV | NV | 2009 | 03 - Prospective |
| | Downtown Las Vegas | Las Vegas | Las Vegas, NV | NV | 2011 | 03 - Prospective |

DRESS FOR LESS

REAL ESTATE LEASE SUMMARY
- Geneva - Lease: 1 Master Lease

Intersection:
City, State Zip: Geneva, IL
Shopping Center:
County:
SqFt Area on
which rent is paid: 30,187  Sites ID: 1150

Landlord

Phone: ( ) -  Fax: ( ) -
Email:

Lease Term (all dates are estimated)
Est. Delivery Date: 01/01/2007  Est. Effective Date: 01/01/2007
Est. Lease Term: 10.8 years  Est. Lease End: 01/31/2017
Options: 4-5 Year
Est. Rent Commencement Date: 04/01/2007

Source:
Modified Source:

| | | | | 30,187 | 30,187 | 0 | 100.0000% | 25,155.83 | 10.00 |

Rent Stream / Options
THE DATES BELOW ARE BASED ON THE PROJECTED DELIVERY DATE

| | Estimated Begin Date | Estimated End Date | Estimated Notice Date | Minimum Rent Per SqFt | Monthly Rent |
|---|---|---|---|---|---|
| Rent Period | 04/01/2007 | 01/31/2012 | | $10.00 | $25,155.83 |
| Rent Period | 02/01/2012 | 01/31/2017 | | $12.00 | $30,187.00 |
| Option Rent | 02/01/2017 | 01/31/2022 | | $13.00 | $32,702.58 |
| 1st Option Period | 02/01/2017 | 01/31/2022 | 08/05/2016 | | |
| Option Rent | 02/01/2022 | 01/31/2027 | | $14.00 | $35,218.17 |
| 2nd Option Period | 02/01/2022 | 01/31/2027 | 08/05/2021 | | |
| Option Rent | 02/01/2027 | 01/31/2032 | | $15.00 | $37,733.75 |
| 3rd Option Period | 02/01/2027 | 01/31/2032 | 08/05/2026 | | |
| Option Rent | 02/01/2032 | 01/31/2037 | | $16.00 | $40,249.33 |
| 4th Option Period | 02/01/2032 | 01/31/2037 | 08/05/2031 | | |

Cotenants:

FIGURE 24

| Year | Trend | Sales | Chg % | GM % | Contribution | Cntrb % | Part Yr |
|------|-------|-------|-------|------|--------------|---------|---------|
| 2007 | 07/07 | 6,242,805 | -3.9% | 36.3% | 0 | 13.6% | |
| 2006 | | 6,362,995 | 9.9% | 36.2% | 1,059,688 | 16.7% | |
| 2005 | | 5,789,503 | 8.9% | 35.9% | 890,020 | 15.4% | |
| 2004 | | 5,318,113 | -5.8% | 35.6% | 762,787 | 14.3% | |
| 2003 | | 5,644,855 | 0.7% | 37.4% | 998,713 | 17.7% | |
| 2002 | | 5,607,046 | 5.4% | 36.9% | 1,011,272 | 18.0% | |
| 2001 | | 5,319,381 | 9.9% | 37.7% | 984,085 | 18.5% | |
| 2000 | | 4,842,215 | -2.8% | 37.3% | 731,174 | 15.1% | |
| 1999 | | 4,984,168 | 1.7% | 37.1% | 832,356 | 16.7% | |
| 1998 | | 4,901,622 | 1.1% | 36.6% | 747,181 | 15.2% | |
| 1997 | | 4,846,486 | 7.7% | 35.1% | 697,443 | 14.4% | |
| 1996 | | 4,500,808 | 5.6% | 35.8% | 602,641 | 13.4% | |
| 1995 | | 4,262,540 | -0.8% | 34.5% | 450,767 | 10.6% | |
| 1994 | | 4,296,988 | -0.1% | 33.7% | 389,631 | 9.1% | |
| 1993 | | 4,301,909 | -2.7% | 35.1% | 406,040 | 9.4% | |

Store Number / Name:

FIGURE 31

1. Does the lease convey ownership to the lessee at the end of the lease term? ○ Yes ● No 2. Does the lessee have an option to purchase the asset at a bargain price at the end of the lease term? ○ Yes ● No 3. Is the term of the lease 75% or more of the economic life of the asset?
   Lease Term: 14.50 / Life of Asset: 20.00  Ratio: 72.5%  ○ Yes ● No 4. Is the present value of the rents, using the lessee's incremental borrowing rate, 90% or more of the fair market value of the asset?
   Total Rent Payments: 2,185,446    Capitalization Rate: 10.000%
   Number of Months: 174              FMV of Asset: 1,507,204
   Borrowing Rate: 6.000%             Ratio: 96.6%
   Rents Present Value: 1,457,313                              ● Yes ○ No

Capital Lease

FIGURE 32

| Begin Date | End Date | Rent Type | Monthly Rent | Total Payments | Months | SL Rent | Used In SLR |
|---|---|---|---|---|---|---|---|
| 10/23/1986 | 10/31/1987 | | 13,974.00 | 167,688.00 | 12 | 13,974.00 | ✓ |
| 11/01/1987 | 07/31/1991 | | 18,178.00 | 818,010.00 | 45 | 18,178.00 | ✓ |
| 08/01/1991 | 01/31/1997 | | 18,178.00 | 1,199,748.00 | 66 | 18,178.00 | ✓ |
| 02/01/1997 | 07/31/2001 | Option Rent | 20,450.00 | 1,104,300.00 | 54 | 0.00 | |
| 08/01/2001 | 01/31/2002 | Option Rent | 21,586.00 | 129,516.00 | 6 | 0.00 | |
| 02/01/2002 | 01/31/2007 | Option Rent | 21,586.00 | 1,295,160.00 | 60 | 0.00 | |
| 02/01/2007 | 01/31/2012 | Option Rent | 23,744.58 | 1,424,674.80 | 60 | 0.00 | |
| 02/01/2012 | 01/31/2017 | Option Rent | 26,119.08 | 1,567,144.80 | 60 | 0.00 | |

Delivered: 08/18/1986
Open Date: 10/23/1986
Rent Commencement: 10/23/1986
Orig Lse Expiration: 01/31/2012
GOB: / /
Construction: Ross Built - Existing Control Start: 10/26/1986
Control End: 01/31/1997
Months: 123
Total Rents: 2,185,446.00
☐ Less TI: 0.00
Net Amount: 2,185,446.00
SL Rent: 17,767.85

Effective: 04/18/2007
Months TD: 246
SL TD: 4,370,891.10
Paid Rent TD: 4,761,911.16
Net SL Rent: 391,020.06
GL Balance: 0.00
Difference: 391,020.06

FIGURE 33

| No. | Maintenance Type | Maintenance | Repair | Replace | Nts |
|---|---|---|---|---|---|
| 107 | Front Door Only | Ross > | Ross > | Ross > | |
| 108 | All Exterior Doors | Ross > | Ross > | Ross > | |
| 109 | Painting - Exterior | Ross > | Ross > | Ross > | |
| 113 | HVAC | Ross > | Ross > | Ross > | (1) |
| 114 | Rear Building Lights | Ross > | Ross > | Ross > | |
| 115 | Truck Dock | Ross > | Ross > | Ross > | |
| 116 | Ross Signs | Ross > | Ross > | Ross > | |
| 201 | Ceiling | Ross > | Ross > | Ross > | |
| 202 | Plumbing | Ross > | Ross > | Ross > | |
| 203 | Electrical | Ross > | Ross > | Ross > | |
| 204 | Concrete Floor | Ross > | Ross > | Ross > | |
| 205 | Painting - Interior | Ross > | Ross > | Ross > | |
| 206 | Floor Covering | Ross > | Ross > | Ross > | (5) |
| 207 | Fire Sprinklers - Interior | Ross > | Ross > | Ross > | |
| 208 | Monitoring & Testing | Ross > | Ross > | Ross > | (3) |
| 301 | Lighting - Parking Lot | Landlord > | Landlord > | Landlord > | |

FIGURE 34

Maintenance & Repairs Responsibilities - Details

Type: Painting - Exterior

Item No: 109

Maintenance: Ross  
Repair: Ross  
Replace: Ross

Method:  
Frequency:

General Maintenance Notes:

(1) Painting-must choose color that are consistent with a reasonable color scheme for shopping center, which is approved by landlord. [M.L., Art 8]

Method / Frequency Notes:

FIGURE 35

User ID: ▢      Password: ▢

[LOG ON]

FIGURE 38

| Store # | Date | Work Order | Problem | Vendor | Completed | Type | PO |
|---|---|---|---|---|---|---|---|
| 0101 | 06/26/2007 | 01010628 0716 | Sidewalk Cleaning | Dpc - Doug Perry Construction | 07/02/2007 | Repair | |
| 0101 | 06/21/2007 | 01010621 0715 | Doors-Exterior | Nationwide Security & Building Service | 07/23/2007 | Repair | |
| 0101 | 06/21/2007 | 01010621 0714 | Electric | Nationwide Security & Building Service | 06/28/2007 | Repair | |
| 0101 | 06/11/2007 | 01010611 0713 | Plumbing | Dpc - Doug Perry Construction | 06/18/2007 | Repair | |
| 0101 | 06/06/2007 | 01010606 0710 | Doors-Exterior | FOR INFORMATION ONLY | 06/06/2007 | Repair | |
| 0101 | 06/06/2007 | 01010606 0711 | Plumbing | Solution Pro | 06/18/2007 | Repair | |
| 0101 | 06/06/2007 | 01010606 0709 | Roofing | Centimark Corp. | 06/12/2007 | CER | |
| 0101 | 06/05/2007 | 01010629 0717 | Doors-Exterior | Nationwide Security & Building Ser | 06/29/2007 | Repair | |
| 0101 | 06/01/2007 | 01010601 0708 | Doors-Exterior | Nationwide Security & Building Service | 07/03/2007 | Repair | |
| 0101 | 05/29/2007 | 01010529 0707 | Glass-exterior | Dpc - Doug Perry Construction | 06/04/2007 | Repair | |
| 0101 | 05/23/2007 | 01010523 0706 | Plumbing | Solution Pro | 05/29/2007 | Repair | |
| 0101 | 05/10/2007 | 01010510 0704 | Plumbing | Solution Pro | 05/14/2007 | Repair | |
| 0101 | 05/08/2007 | 01010508 0703 | Pest Control | Copesan | 05/17/2007 | Repair | |
| 0101 | 05/04/2007 | 01010504 0702 | Compactor | Marathon Equipment Company | 07/23/2007 | CER | |
| 0101 | 05/04/2007 | 01010503 0701 | Plumbing | Solution Pro | 05/10/2007 | Repair | |
| 0101 | 04/23/2007 | 01010522 0705 | Doors-Exterior | Metro Door | 05/22/2007 | Repair | |

FIGURE 39

Facilities Repair Service Request (If this is a store fixture request, do not use this form. Rather, use the Fixture Purchasing Requisition form)
(If this is a telephone, cash register or computer problem, contact the ROSS HELP DESK at (510) 505-4357.)

| | |
|---|---|
| Store Number: | 508 |
| Store Name/City: | Brownsville |
| Date: | 04/14/05 |
| Prepared By: | Ivania Portillo |
| Store Contact: | Rolando Martinez |
| Problem Type: | Cooling - Too Warm in Store |
| Issue Type: | Business Impact |
| Priority: | EMERGENCY! - Please Review Instructions Tab For Phone Number To Call |
| Location Within Store: (list multiple locations in space below) | Front of Store |
| Problem Description: (be as specific as possible) | Front vent is blowing hot air - Front of store. |
| (Additional description - three sentences per cell) | Stockroom area has same problem. |
| (Additional description - three sentences per cell) | |

Close Out Information

| | | | | |
|---|---|---|---|---|
| 04800822O749 | Date: 08/22/2007 | Vendor: Nationwide Security & Buildin | NTE Amount: 605.31 |
| Problem Type: Door Bell | | Priority: Priority - 48 Hours | Coordinator: Mia Finnigan |
| ☑ Work Order is Closed / Complete | | Closed: 08/30/2007 | Closed By: MIAFINN |
| Contractor Approval Rating For This Job: 5 (1 to 10) | | | Approval To Pay This Invoice: Yes |
| Closeout Notes: | 08/30/2007 12:15:03 PM ~ Work order closed by MIAFINN 08/30/2007 12:15:03 PM ~ Work order status changed from [Closed / Complete] to [Closed / Complete] by MIAFINN | | |

REAL ESTATE MANAGEMENT SYSTEM AND METHOD

APPENDICES

Appendix A (1 page) shows a summary of the data tables for an implementation of a real estate management system; and Appendix B (13 pages) shows an example of certain data tables for an implementation of a real estate management system.

Appendices A and B form part of the specification and are incorporated herein by reference.

FIELD

A property management system and method are described and in particular a real estate management system and method are described.

BACKGROUND

Systems for management of a piece of real estate are well known. In addition, systems for managing a construction project are also well known. Systems for managing leases is also known. Systems for managing a property are also well known. However, none of these systems provide a comprehensive system for managing all aspects of real estate through every step of the real property lifecycle. Thus, it is desirable to provide a real estate management system and method that manages all aspects of real estate through every step of the real property lifecycle and it is to this end that the invention is directed.

BRIEF DESCRIPTION OF THE DRAWINGS

FIG. 3 illustrates an example of an "add" new sites user interface of the site selection module of the real estate management system;

FIG. 4 illustrates an example of a pending site queue user interface of the site selection module of the real estate management system;

FIG. 5 illustrates an example of a change log user interface of the site selection module of the real estate management system;

FIG. 7 illustrates an example of a new sites by city report user interface of the site selection module of the real estate management system;

FIG. 8 illustrates an example of a broker finder user interface of the site selection module of the real estate management system;

FIG. 13 illustrates an example of an impacted site user interface of the site selection module of the real estate management system;

FIG. 14 illustrates an example of a site listing user interface of the site selection module of the real estate management system;

FIG. 17 illustrate an example of a general, detailed site summary user interface of the site selection module of the real estate management system;

FIG. 21 illustrates an example of a lease wizard user interface of the deal tracking module of the real estate management system;

FIG. 24 illustrates an example of a lease summary report screen of the deal tracking module of the real estate management system;

FIG. 31 illustrates an example of a sales history summary screen of the property management module of the real estate management system;

FIG. 32 illustrates an example of a capital lease questionnaire screen of the lease administration module of the real estate management system;

FIG. 33 illustrates an example of a rent summary screen of the lease administration module of the real estate management system;

FIG. 34 illustrates an example of a maintenance and repair matrix of a facility management module of the real estate management system;

FIG. 35 illustrates an example of a free form notes section regarding maintenance and repair of a facility management module of the real estate management system;

FIG. 38 illustrates an example of a login screen to the real estate management system;

FIG. 39 illustrates an example of a work order finder screen of a facility management module of the real estate management system;

FIG. 40 illustrates an example of a work order request screen of a facility management module of the real estate management system;

FIG. 41 illustrates an example of a work order detail screen of a facility management module of the real estate management system;

FIG. 42 illustrates an example of a word order closeout screen of a facility management module of the real estate management system;

FIG. 43 illustrates an example of a report parameter user interface of the real estate management system;

FIG. 45 illustrates an example of a report filter user interface screen of the real estate management system.

DETAILED DESCRIPTION OF ONE OR MORE EMBODIMENTS

The system and method are particularly applicable to a client/server real estate management system that is implemented using the Internet, one or more hardware devices and one or more pieces of software code executed by processing units and it is in this context that the system and method are described. It will be appreciated, however, that the system and method has greater utility since the system and method can be implemented using other architectures such as a stand-alone system, a web-based system in which a user can interact with the system entirely using a web browser application on a computing device, a peer to peer system, a mainframe system and the like and the system and method may be implemented using software, hardware and/or the combination of hardware and software as described below and the system and method are not limited to the particular illustrative implementations described below.

The system and method are a real estate management system and method that integrates components/modules/processes for every step of a real property life cycle. Now, an embodiment of the real estate management system implemented in a client/server system is described with reference to FIG. 1. Management of real estate is defined as the identification, acquisition, development (design and construction), management, maintenance and disposal of the real estate.

Figure 1:
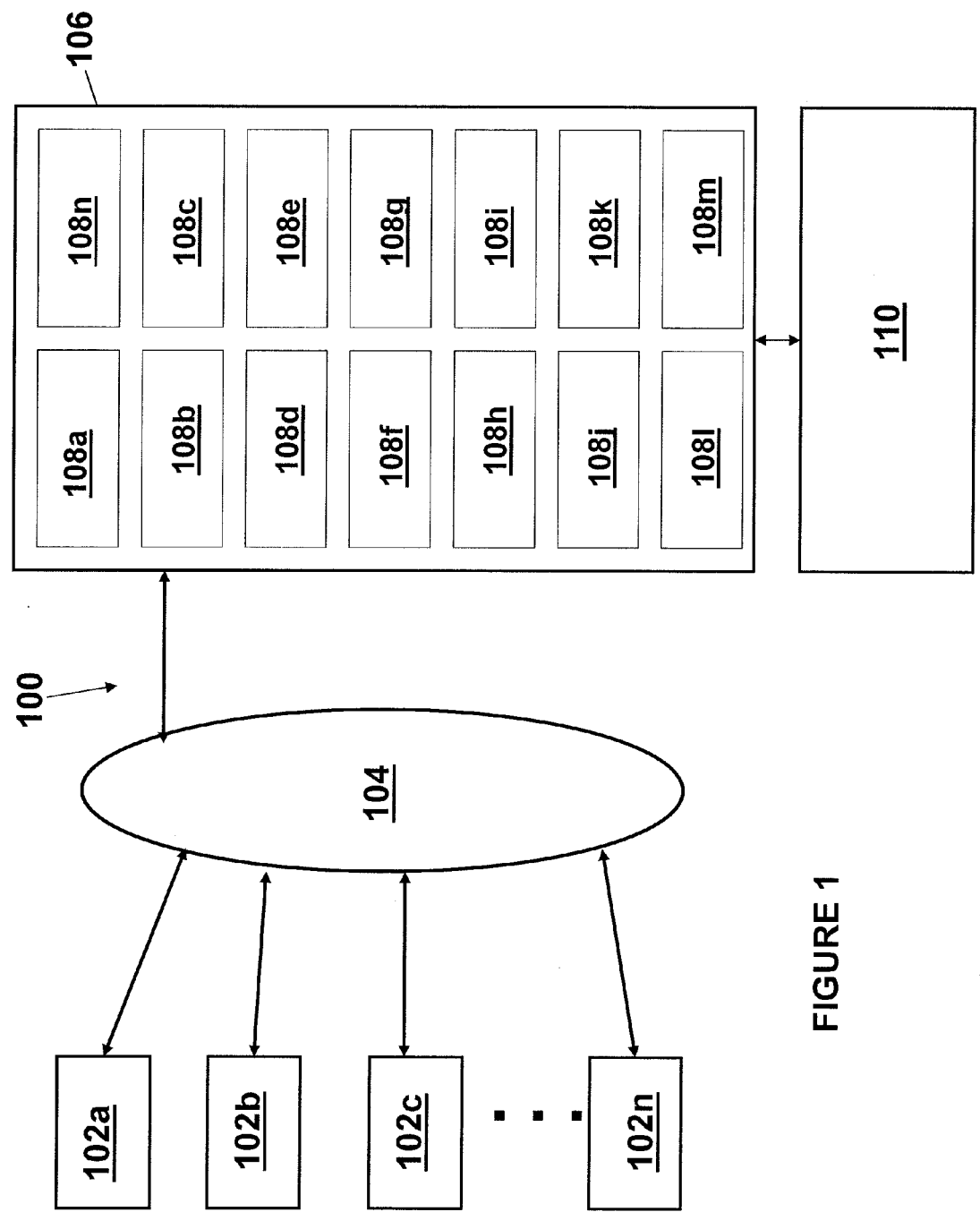
FIG. 1 is a block diagram illustrating an example of a client/server implementation of a real estate management system.

FIG. 1 is a block diagram illustrating an example of a client/server implementation of a real estate management system 100. In the client/server implementation, a computing device 102 is used to interact with the real estate management unit 106 in which application user interface screens are displayed to the user at the computing device connected to the real estate management unit and there is some ability to receive certain information from the system using a web browser application. The system may include one or more computing devices 102, such as devices 102a, 102b, 102c, . . . , 102n, that can interface and communicate over a communications link 104 with a real estate management unit 106. Each computing device 102 may be a device with one or more processing units, a storage device, memory (DRAM or SRAM), display and connectivity to be able to interact with the real estate management unit 106 such as a personal computer, laptop computer, desktop computer, a wireless device, a wireless email device, an integrated device such as a RIM Blackberry or Palm Treo device, a mobile phone or a cellular phone. In the example implementation shown in FIG. 1, each device may establish a communications session using a typical protocol over the communications link 104 with the real estate management unit 106 and then exchange data with the real estate management unit 106 such as web pages and information contained in the web pages and application user interface screens on the computing device that is executing a real estate management application. In the example implementation, the communications link 104 may be the Internet or the World Wide Web, a cellular network, a mobile network, a wired network or a wireless network using a protocol and the real estate management unit 106 may include a web server (that may be a software based web server such as Apache) that serves web pages to each device 102 and receives data from each of the devices 102.

The system may also include a storage unit 110 that is coupled to the real estate management unit 106 wherein the storage unit 110, that may be software based database, that may store data associated with each user of the real estate management system, data associated with each module of the real estate management unit and the user interfaces delivered to each device in the web pages. Appendix A shows an example of the data tables of an implementation of the real estate management system and method and Appendix B illustrates examples of certain data tables for an implementation real estate management system and method that may be stored in the storage unit 110. Appendix A and Appendix B are incorporated herein by reference.

The real estate management unit 106 may be, for example, one or more server computers with the typical elements wherein the one or more server computers execute a plurality of lines of computer code in a set of modules 108 that implement the real estate management system functions and processes as described below. In one embodiment, the real estate management unit may use Microsoft® Visual Fox Pro, Microsoft®.Net and Microsoft® SQL server languages to implement the real estate management unit. The modules may include one or more of a site selection module 108a, a deal tracking module 108b, a real estate law module 108c, a document management module 108d, a store design module 108e, a construction module 108f, a property management module 108g, a lease administration module 108h, a percent rents module 108i, a property taxes module 108j, an expense audit module 108k, a facility maintenance module 108l, a sublease administration module 108m and a report and infrastructure module 108n. Each module may also be implemented in hardware or a combination of hardware and software. Each of these modules is now described in more detail.

In the embodiments, the real estate management system shown in FIG. 1 may be controlled by an owner of the real estate management system. The owner may own a copy of the real estate management system or may be a licensee of the real estate management system. In the exemplary embodiment, the owner may be a corporate entity, such as Ross Stores, Inc., to identify any new sites for their stores, build the new stores, manage the new stores, etc using the real estate management system that integrates various processes to perform the real estate management for the corporate entity. In other embodiments, the real estate system may be a commercial software product sold to any business or an ASP model product. In addition, the real estate management system may also be used to manage various types of real estate properties other than the stores and sites described below.

Site Selection Module

The shttp://www.pdsitelink.com/SiteSelection.htmite selection module 108a may include a five year development plan, attached files of site plans, aerial photos, and maps, listing of competitors and cotenants, demographics, proforma calculation and impacted stores, real estate committee approval, and pin maps that are described below in more detail.

Five Year Plan

In the exemplary embodiment of the real estate management system, potential new sites for stores go through a planning process where potential new sites are initially entered by one or more real estate brokers and then eventually reviewed and submitted to the database by real estate employees of the owner of the real estate management system. Using the real estate system, sites that are projected to open or close over the next five years may be displayed in a variety of ways using one of the fifteen preformatted Five Year Plan reports that are part of the real estate management system. The site data may be shown in detail or rolled-up by city, by designated marketing area (DMA), region, state, etc. The Alternate Five Year Plan feature allows users to run what-if scenarios without impacting the published Five Year Plan numbers.

Figure 2:
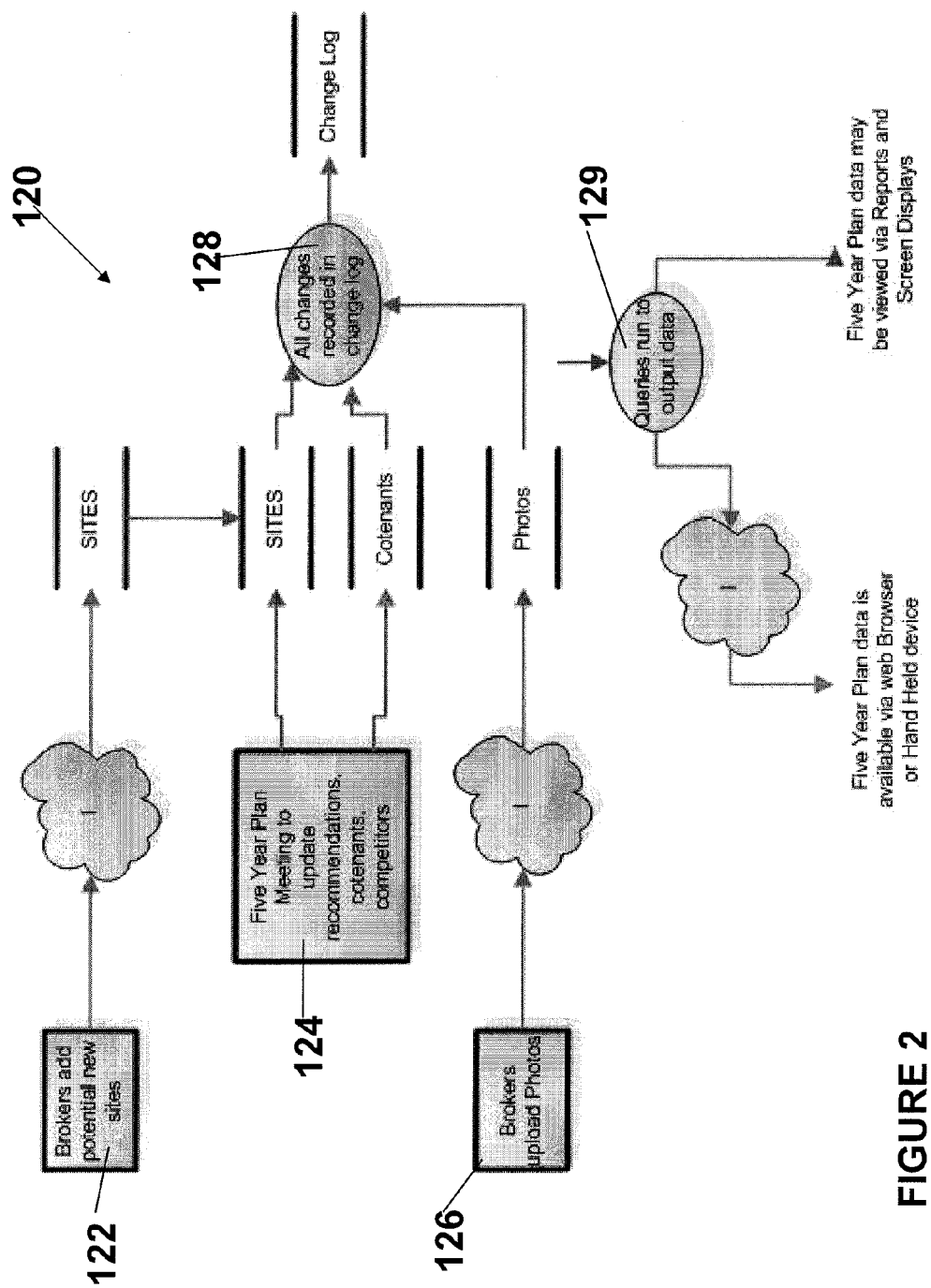
FIG. 2 illustrates an example of five year plan user interface of the site selection module of the real estate management system.

FIG. 2 illustrates an example of a five year plan user interface 120 of the site selection module of the real estate management system. The Five Year Plan facilitates the process of locating potential new sites in which real estate brokers who are located throughout the country are allowed to enter potential new locations into a Five Year Plan database (122) stored in the storage unit 110. Then, these sites are reviewed by personnel in the real estate department of the owner and a determination is made to reject the site or to submit it for further review. Then, on an annual basis, a Five Year Plan meeting may be held with each broker and the potential sites as well as existing sites are reviewed (124). Then, recommendations are made and entered into the real estate management system, and the sites are updated with the current cotenants and competitors. Then, brokers upload site photos (126) and site maps into the database throughout the year as they become available. All changes to the database are captured and stored in a change log table (128) so that real estate personnel can monitor the Five Year Plan data. The owner of the real estate management system may then run queries against the database (129) to output data wherein the data may be five year plan data viewed as reports and screen displays or viewed via web browser on the one or more computing devices shown in FIG. 1.

Figure 3:
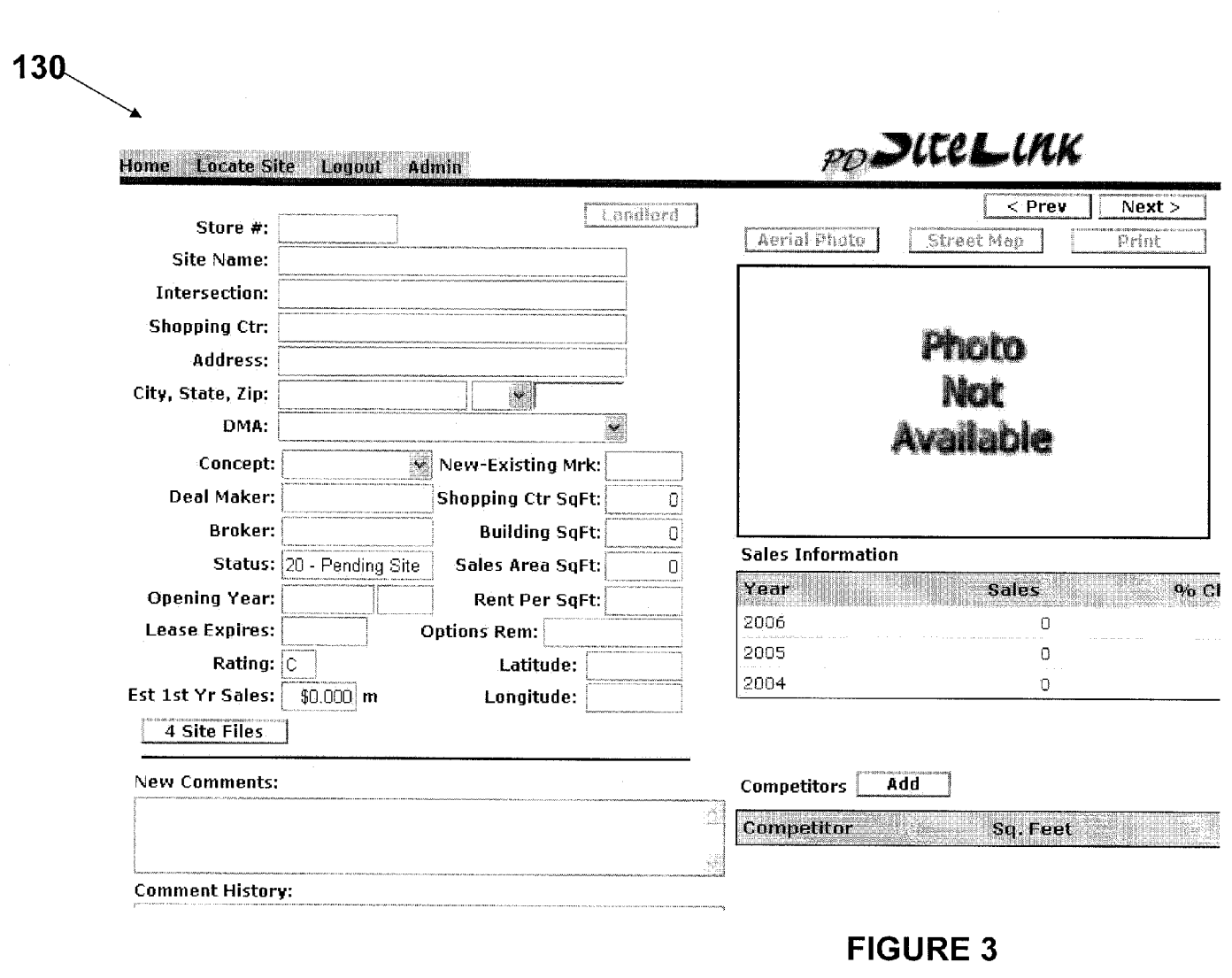

FIG. 3 illustrates an example of add new sites user interface 130 of the site selection module of the real estate management system. Using this user interface, a real estate broker can input information (as shown for example in FIG. 3) about potential new sites and add current recommendations for how to proceed with existing sites via a webpage such as that shown in FIG. 3. The broker may also attach photos and site plans to the webpage. Thus, the real estate management system allows a third party, such as a broker, sign contractor, lawyer, etc., not related to the owner, to enter real estate information into the real estate management system. Thus, the real estate management system allows the owner to leverage non-employees (brokers) in a secure way to contribute information to the real estate management system.

FIG. 4 illustrates an example of a pending site queue user interface 140 of the site selection module of the real estate management system. In particular, once a new site is added by an employee or third party, the new sites appear in a pending sites queue as shown in FIG. 4. In the exemplary embodiment owned by Ross Stores, two users/employees representing different disciplines within the real estate group of Ross Stores must approve the pending sites before they are transferred into the five year plan as a "forecast" site.

FIG. 5 illustrates an example of a change log user interface 150 of the site selection module of the real estate management system. As described above, the changes to the five year plan are logged into the change log table shown in FIG. 5 that can be viewed by users with the appropriate access rights, such as administrators. The change log table can be filtered by a variety of parameters 152 including who made the change, the type of change and a date change range. FIG. 5 illustrates an example of a number of change log entries wherein each change log entry shows, among other data, the user who made the change and the change made to the particular table and field by the user. Thus, the real estate management system allows an authorized user to track the changes in the system (and filter those changes).

Figure 6:
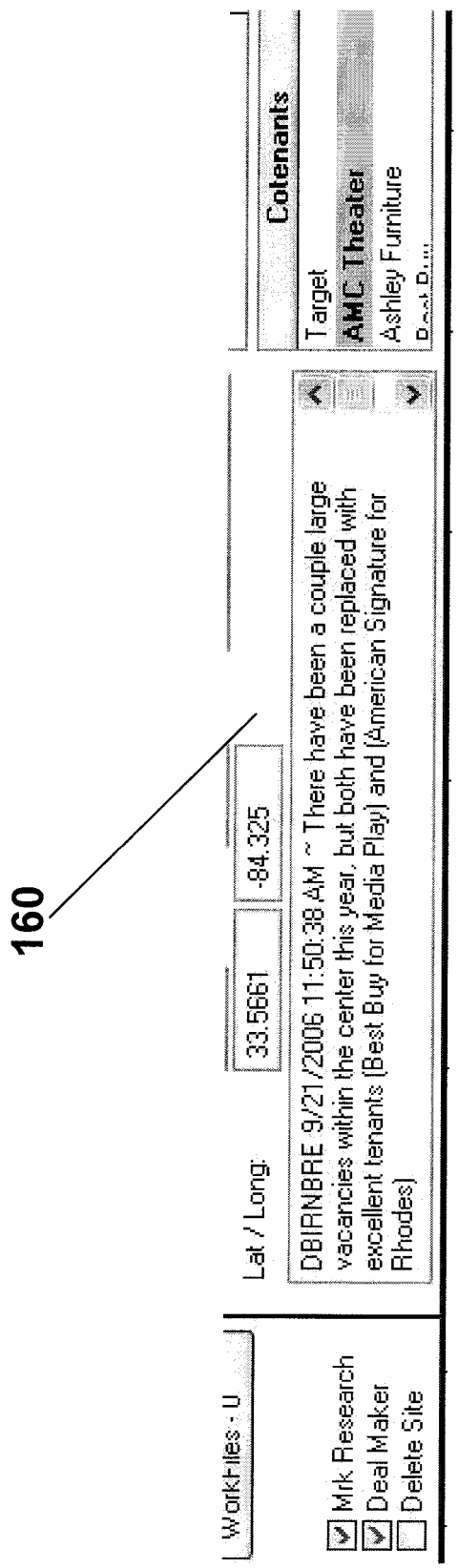
FIG. 6 illustrates an example of a broker recommendation user interface of the site selection module of the real estate management system.

FIG. 6 illustrates an example of a broker recommendation user interface 160 of the site selection module of the real estate management system. As described above, all new sites and existing sites are reviewed during the five year plan meetings in the exemplary embodiment. The attendees at these meetings include personnel from the real estate department of the owner and brokers. The site records are updated during the meetings to include a current list of cotenants and competitors. The status of a site may change from "forecast" to "prospective" or it may be rejected and dropped from the five year plan. During the meetings, the authorized brokers may also insert "recommendation" comments into the site record as shown in FIG. 6.

FIG. 7 illustrates an example of a "New Sites by City" report user interface 170 of the site selection module of the real estate management system. In particular, a variety of reports that display the five year plan data may be generated and filtered by a variety of parameters including: Concept, Status, Deal Maker, DMA, etc. The listing of reports includes: Anticipated Store Growth, Existing Stores By Market, Five Year Plan Summary, New Markets, New Sites By City, New Sites By City—New Markets, New Sites By DMA Market, New Sites By New and Existing Markets, New Sites By Opening Year, New Sites By Ranking, New Sites By State and Sites Flagged For Deletion. FIG. 7 illustrates an example of the New Sites By City report 170.

FIG. 8 illustrates an example of a broker finder user interface 180 of the site selection module of the real estate management system. In the system, brokers are able to access the five year plan data for their respective area via the internet and view site status, historical sales data and attached cotenants and competitors. Brokers may update their recommendations throughout the year.

Figure 9:
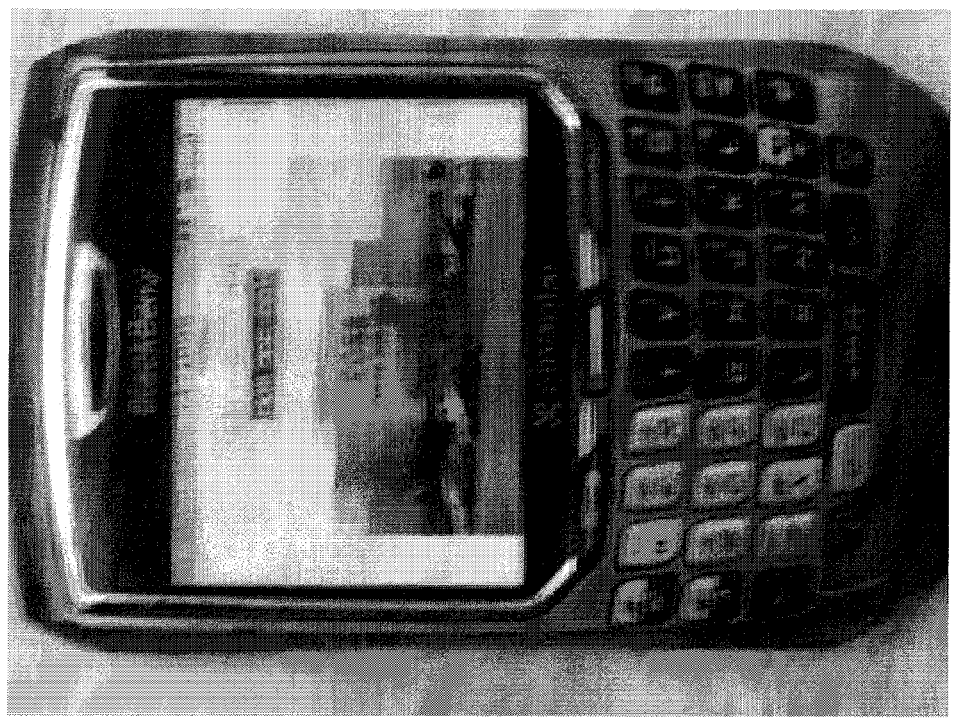
FIG. 9 illustrates an example of a wireless device showing five year plan data of the site selection module of the real estate management system.

FIG. 9 illustrates an example of a wireless device showing five year plan data of the site selection module of the real estate management system. The system permits authorized real estate personnel to access the five year plan database via handheld devices (i.e. Blackberry) to view site status, lease summary information, store front photos, etc. The five year plan database is also accessible to real estate personnel by logging onto the application locally within the Company's network.

Site Plans, Aerial Photos, Maps

The system may be used to store an unlimited number of site plan diagrams, aerial photos, demographic maps, street maps and photos that may be attached to each site record. The attached files are viewed using the associated application (i.e. Adobe, MS Picture Manager, MS Visio, etc.).

Figure 10:
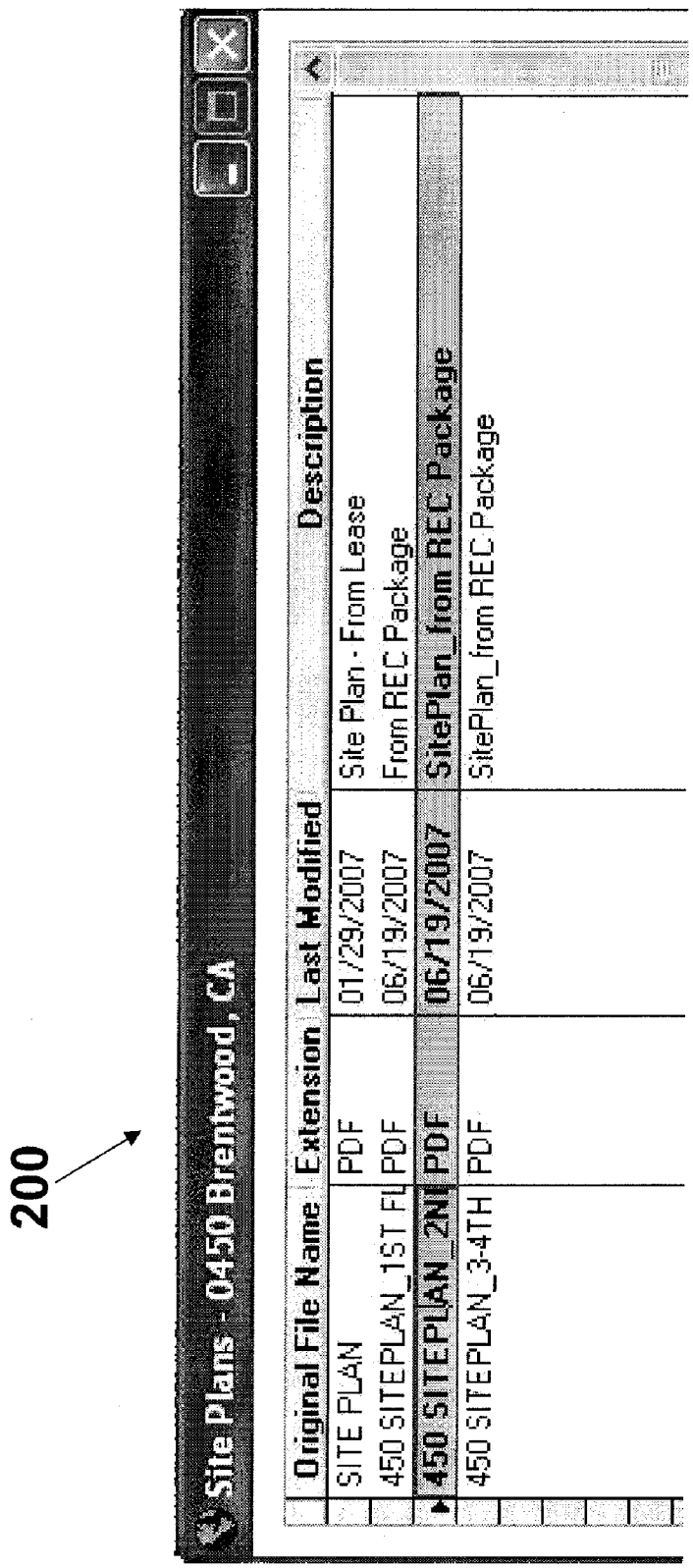
FIG. 10 illustrates an example of a site plan list user interface of the site selection module of the real estate management system.
Figure 11:
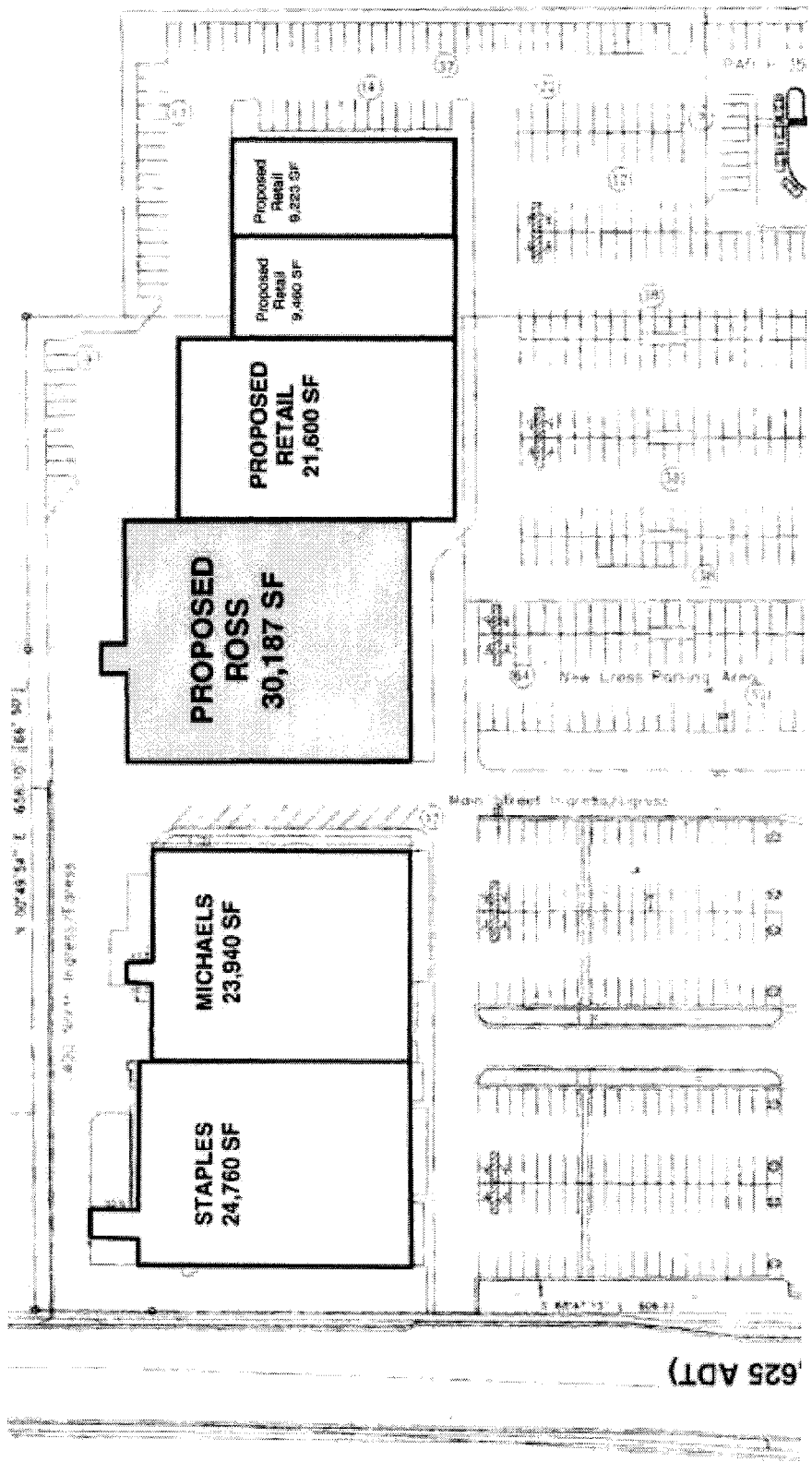
FIG. 11 illustrates an example of a site plan of the site selection module of the real estate management system.

FIG. 10 illustrates an example of a site plan list user interface 200 of the site selection module of the real estate management system since the system allows multiple site plan documents to be attached to each site. The attachment of site plans to sites is done by browsing to the file and double clicking it. A description may be entered to further describe each site plan document. When an authorized user double clicks on one of the rows in the site plan grid (such as the shaded row shown in FIG. 10), the system launches the appropriate associated program (typically Adobe Reader) and displays the attached site plan document as shown for example in FIG. 11.

Figure 12:
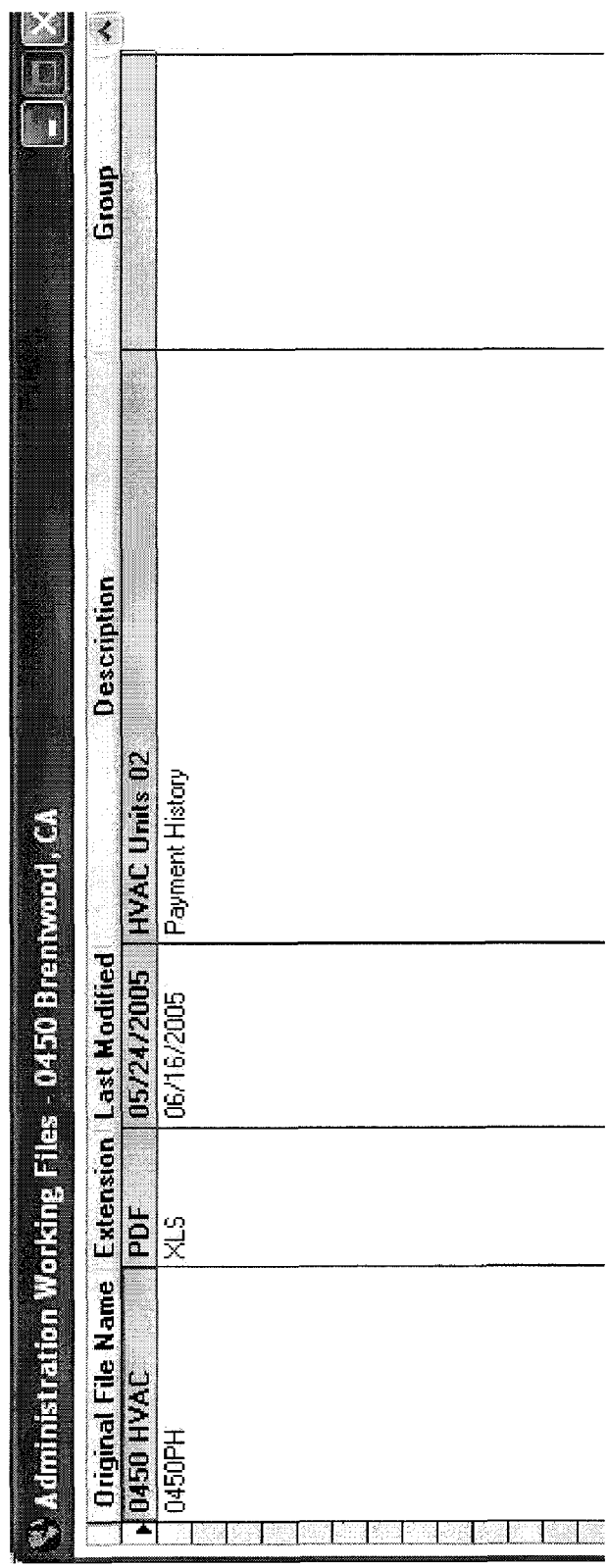
FIG. 12 illustrates an example of a working file user interface of the site selection module of the real estate management system.

In addition to the site plan files described above, the system also permits an unlimited number of working files to be attached to each site as shown in FIG. 12. The work Files may be documents that were created using third party programs such as Excel, Word, Abode Acrobat, etc. When a row on the work files grid is double clicked, the associated program (i.e. Word, Excel, etc.) is launched and the attached file is displayed to the user.

The system may also permit data about an unlimited number of cotenants and competitors to be attached to each site by selecting from a predefined drop down list. The system also permits co-tenancy requirements to be defined and monitored as cotenants change and vacate the shopping centers. The system may also provide over twenty predefined reports to provide answers to questions like, 'What stores do we have where this company as a cotenant', and 'What financial results can we expect if we move in next to this cotenant'.

The system may also track demographic information (with as many as thirty data elements) such as day time population, number of shopping centers per household, number of square feet, etc. The demographics data is tied to each geographic field in the database including county, state, DMA, zip code, etc. Custom demographic groups may be created and linked to each site such as three mile radius, trade area, etc. Demographic data may be input manually or imported from third party demographic databases.

The system may also track existing sites that may be impacted by opening new sites and this information may be attached to each site record. A predefined formula calculates the total impact the new site will have on the existing sites. One impact is the impact on sales because, when a potential new site is reviewed for opening, the surrounding existing stores may have their sales negatively impacted because the new store will potentially take revenues away from these existing stores. The system has a screen where these potentially impacted sites are listed and the total sales impact is calculated. FIG. 13 illustrates an example of an impacted site user interface of the site selection module of the real estate management system. In the example shown in FIG. 13, three existing stores will have their sales negatively impacted by a total $1.1 m when the potential new store opens.

The site selection module also manages, in the exemplary embodiment, a real estate committee approval wherein a pre-formatted priority listing report displays all of the prospective sites to be reviewed by the Real Estate Committee. Each site is listed with its accompanying data and review type classification. Summary reports and various schedules are generated by the system that are included in the Real Estate Committee package.

Figure 15:
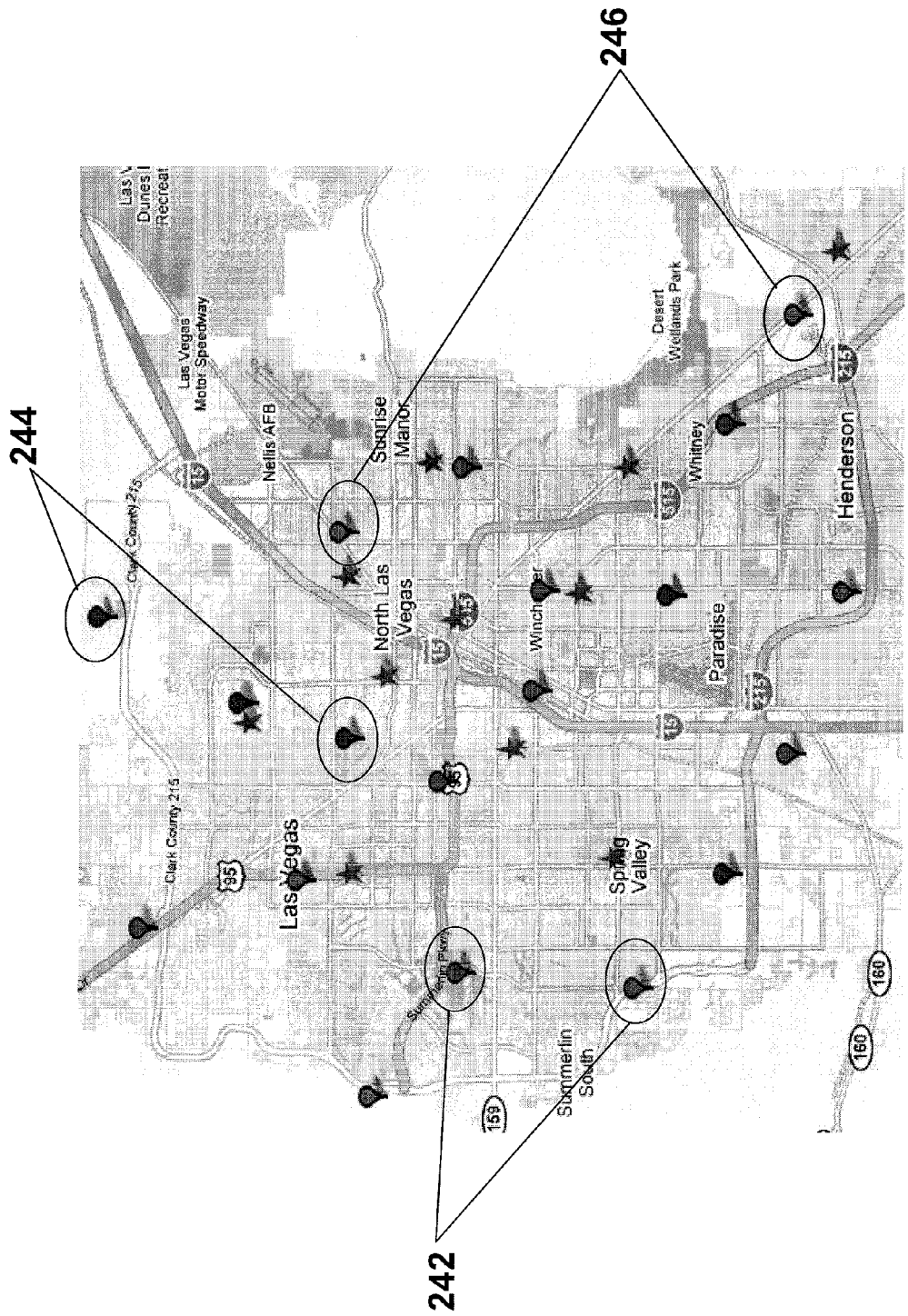
FIG. 15 illustrates an example of a pin map user interface of the site selection module of the real estate management system.

The site selection module also provides pin maps. For example, sites that are filtered using one of the Site Finder screens may be displayed in 'Pin Map' format using the built-in interface to a map generation application, such as Google® Maps. The color of the pins (such as shown in FIG. 15) corresponds to the status of the site (i.e. Open, Approved, Prospect, etc.). Thus, for example a set of blue pins 242 represent open sites, a set of green pins 244 represent approved sites and a set of red pins 246 indicate a prospect site.

Figure 16B:
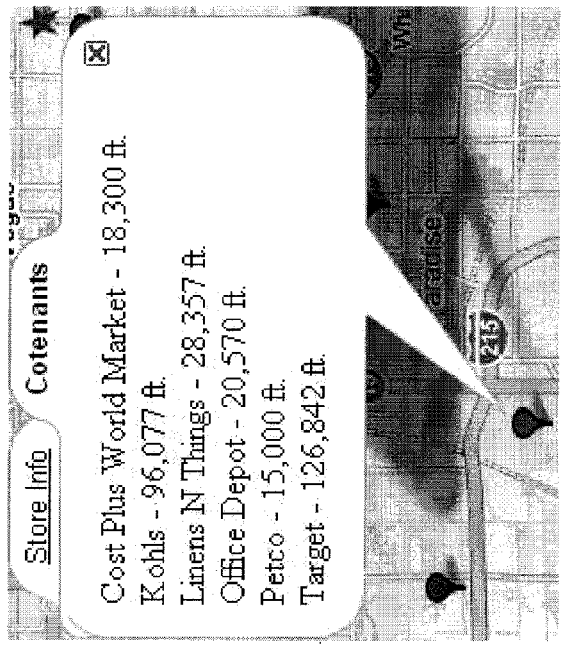
FIGS. 16A and 16B illustrate examples of a pin map abbreviated site summary user interface of the site selection module of the real estate management system.
Figure 16A:
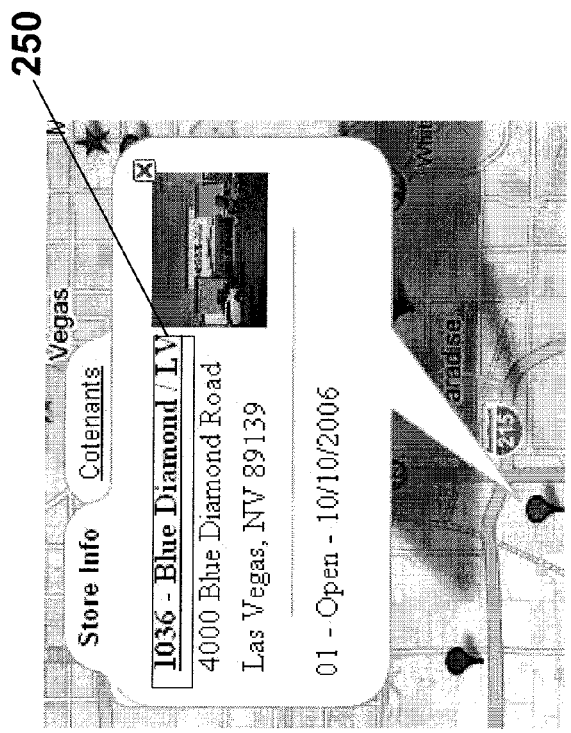
Figure 17:
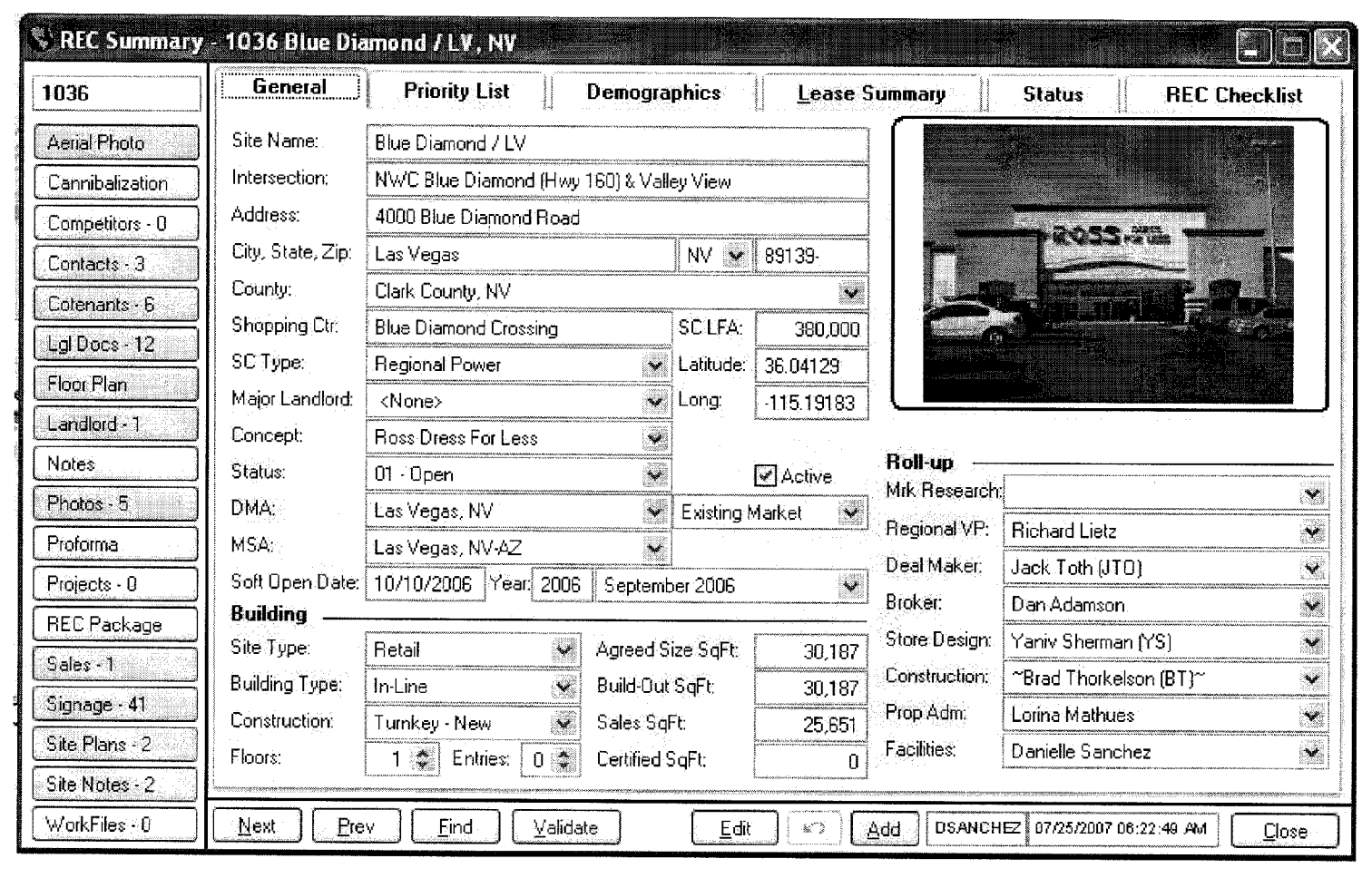

In more detail, using any of the Site Finders, the listing of sites may be filtered by entering parameters. In the example shown in FIG. 14, the sites table has been filtered to show sites in the Las Vegas market. Clicking on a 'Pin Map' button 240 launches the mapping application (Google Maps in this example) and plots the sites on a map as shown in FIG. 15. The different color of pins represent the various stages of development as described above. The different shapes of the pins, stars or balloons represent different concepts. As shown in FIGS. 16A and 16B, clicking on one of the pins on the map displays a small information bubble that has two tabs. The first tab (shown in FIG. 16A) displays the site address and a thumbnail photo of the related store and a second tab (shown in FIG. 16B) lists the cotenants and their respective square footage. Clicking on a Site Name Link (250 in FIG. 16A) launches the Site Summary screen as shown in FIG. 17 where all modules of the real estate management system may be accessed. Different site summary screens launch depending on the user group of the current user and his/her authorization levels.

Figure 18:
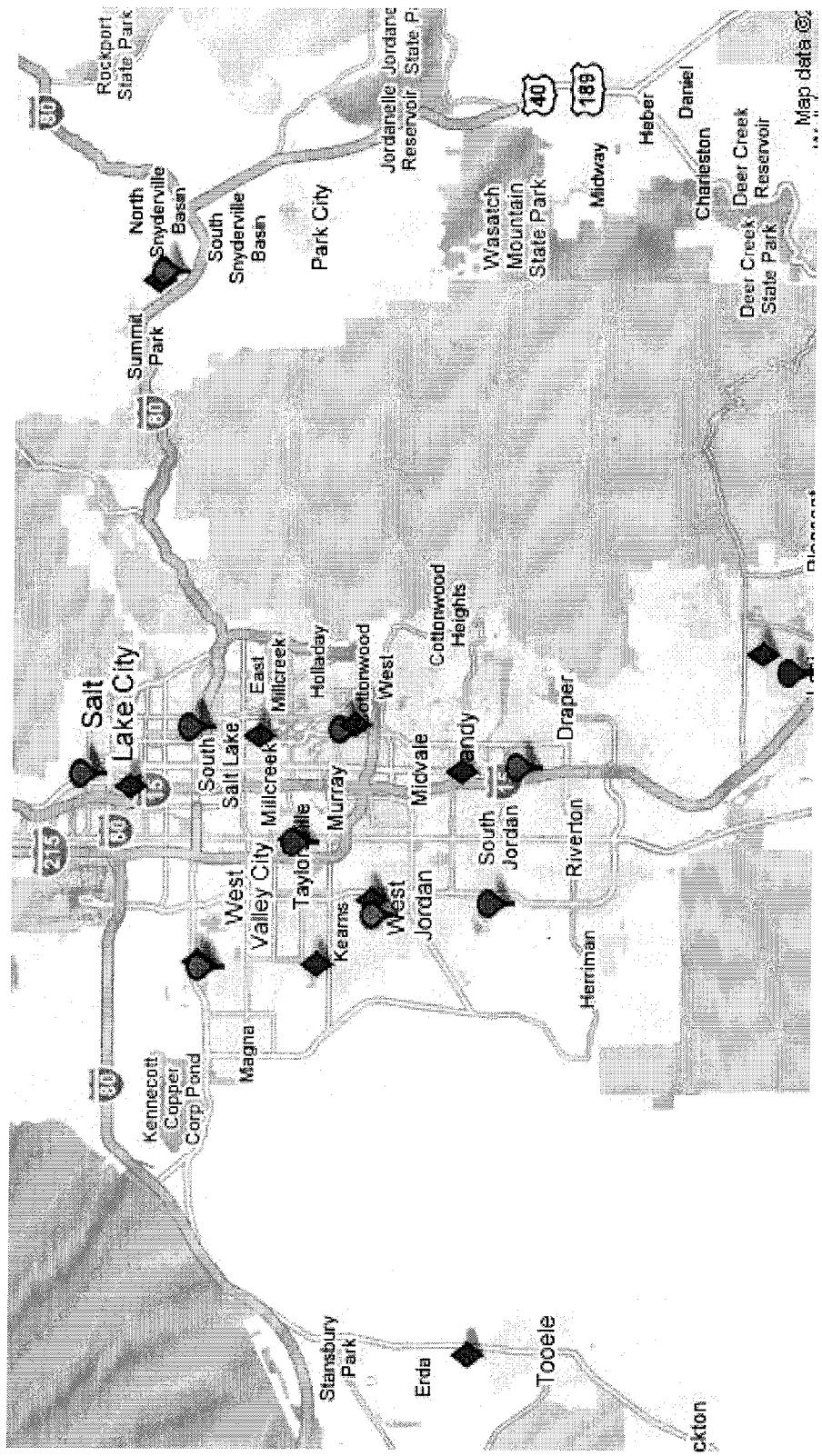
FIG. 18 illustrates another example of a pin map user interface of the site selection module of the real estate management system.

As shown in FIG. 18, the pin map may also show competitors who may be plotted on the pin map to show their proximity to the company's sites. The pin map wizard guides the user through the creation of a pin map with competitors. The first step is to define the geographic areas to be displayed. The second step is to define which competitors are to be displayed on the map and to designate a color/symbol for each competitor. The third step is to define which company sites to display. The last step is to generate the actual pin map and to display it using Google Maps such as the example shown in FIG. 18. In the pin map displayed in FIG. 18, the round pins represent the existing and proposed company sites. The diamonds represent existing Wal-Mart sites which are a competitor to the owner of the real estate management system.

Deal Tracking Module

Figure 19:
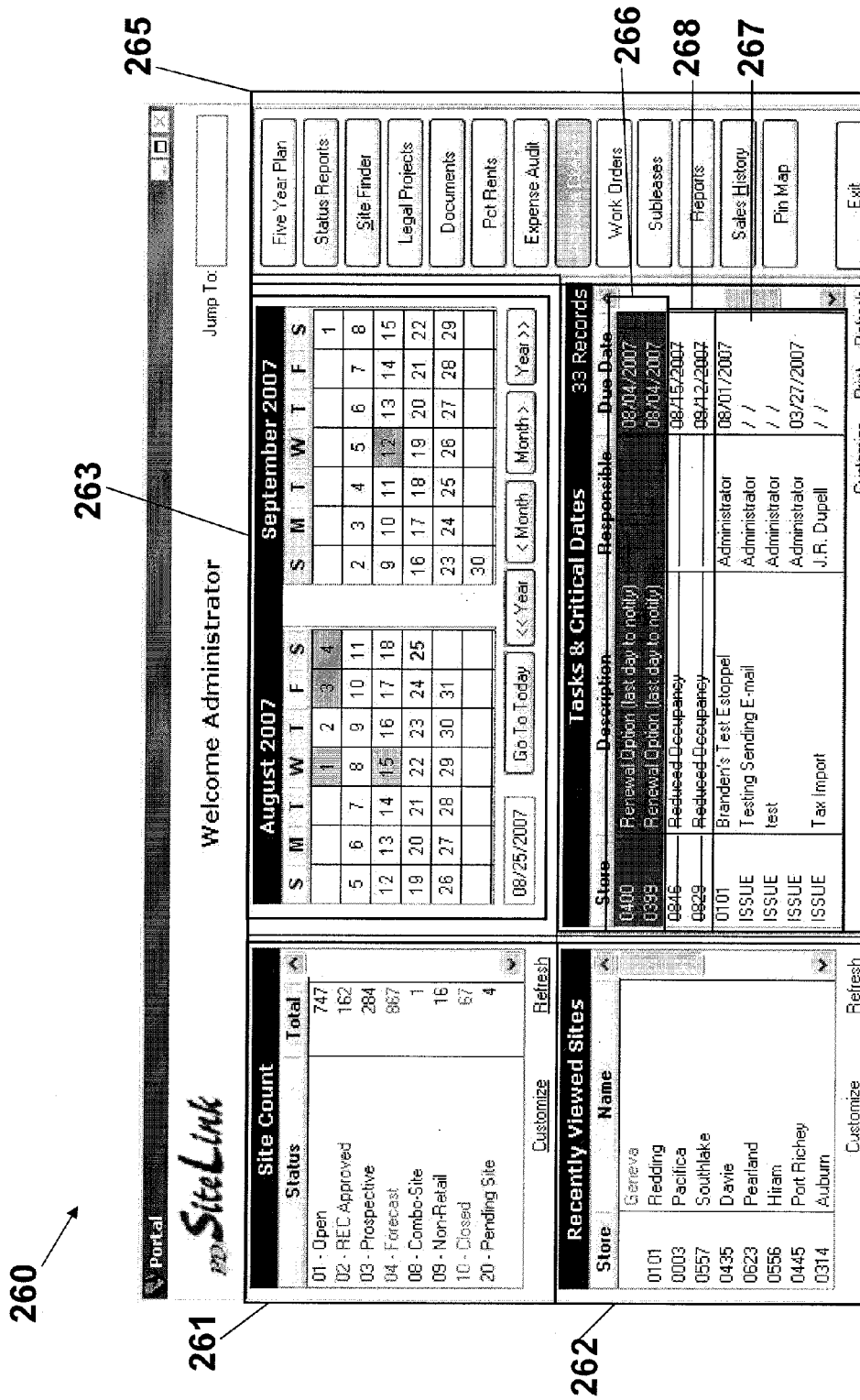
FIG. 19 illustrates an example of a user portal of the deal tracking module of the real estate management system.

The deal tracking module may include a real estate portal and each member of the real estate user group (in the exemplary embodiment) has his or her own customizable portal when the user logs into the real estate management system. The portal lists critical tasks and dates, sites in the development pipeline and it may contain short cut keys that allow access to the more popular and recently used sections of the application. An example of a user customized portal 260 is shown in FIG. 19.

The portal is divided into five sections including a site count by status section 261, a recently viewed sites section 262, a calendar section 263, a tasks and critical dates section 264 and a links section 265. In the portal, each section displays data that is relevant to the user or that the user is authorized to view. The buttons in the links section 265 take the user directly to the more frequently used modules of the application.

Figure 20:
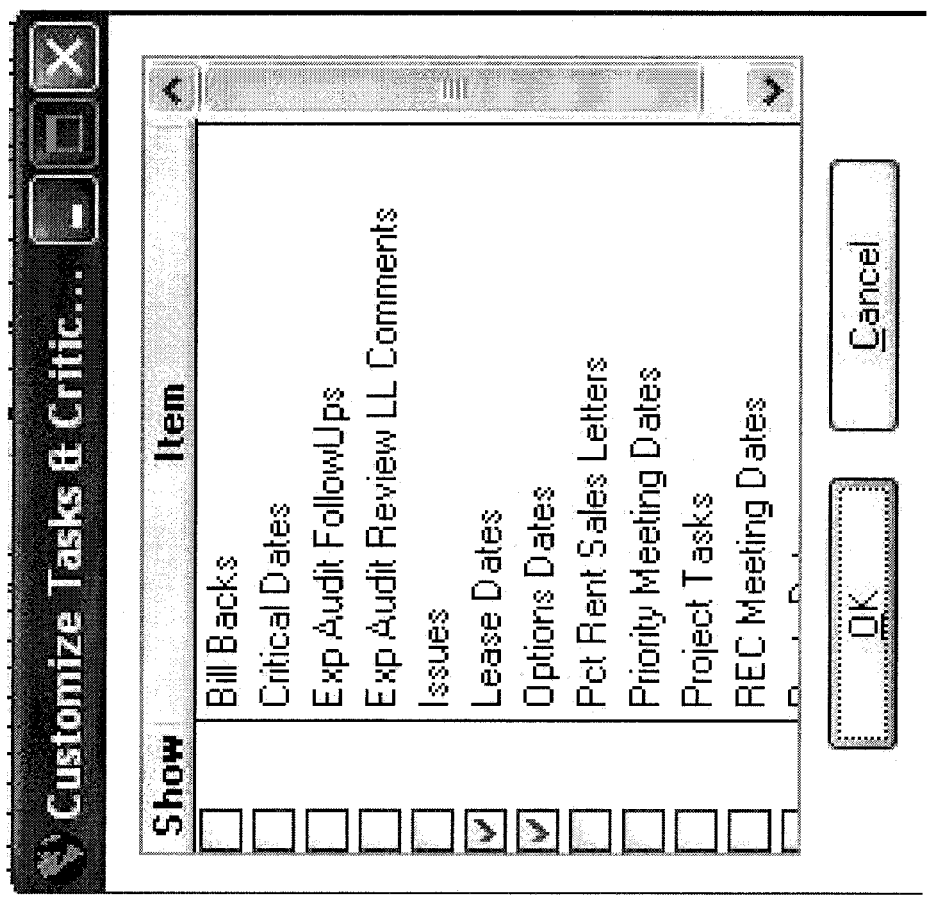
FIG. 20 illustrates an example of a customize tasks and critical dates user interface of the deal tracking module of the real estate management system.

The tasks and critical dates section 264 of the portal displays critical dates that are approaching. In one embodiment, tasks or dates 266 that are due within the next 30 days are highlighted in red, items 267 that are due within the next 90 days are highlighted in yellow. As the tasks are accomplished, a 'strike through' line 268 is displayed on the tasks. Each user may customize his or her portal by clicking the 'Customize' link and by selecting the items they want to appear in their task grid as shown in FIG. 20.

Letter of Intent

The deal tracking module may also track the status of letters of intent (LOI). In the system, drafts of the LOI may be stored and attached as working files. Clicking on these working files launches the associated application (i.e. MS Word). When the final LOI is signed, a scanned copy of it is attached to the site record and it is available for viewing at anytime.

Lease Wizard

Figure 21:
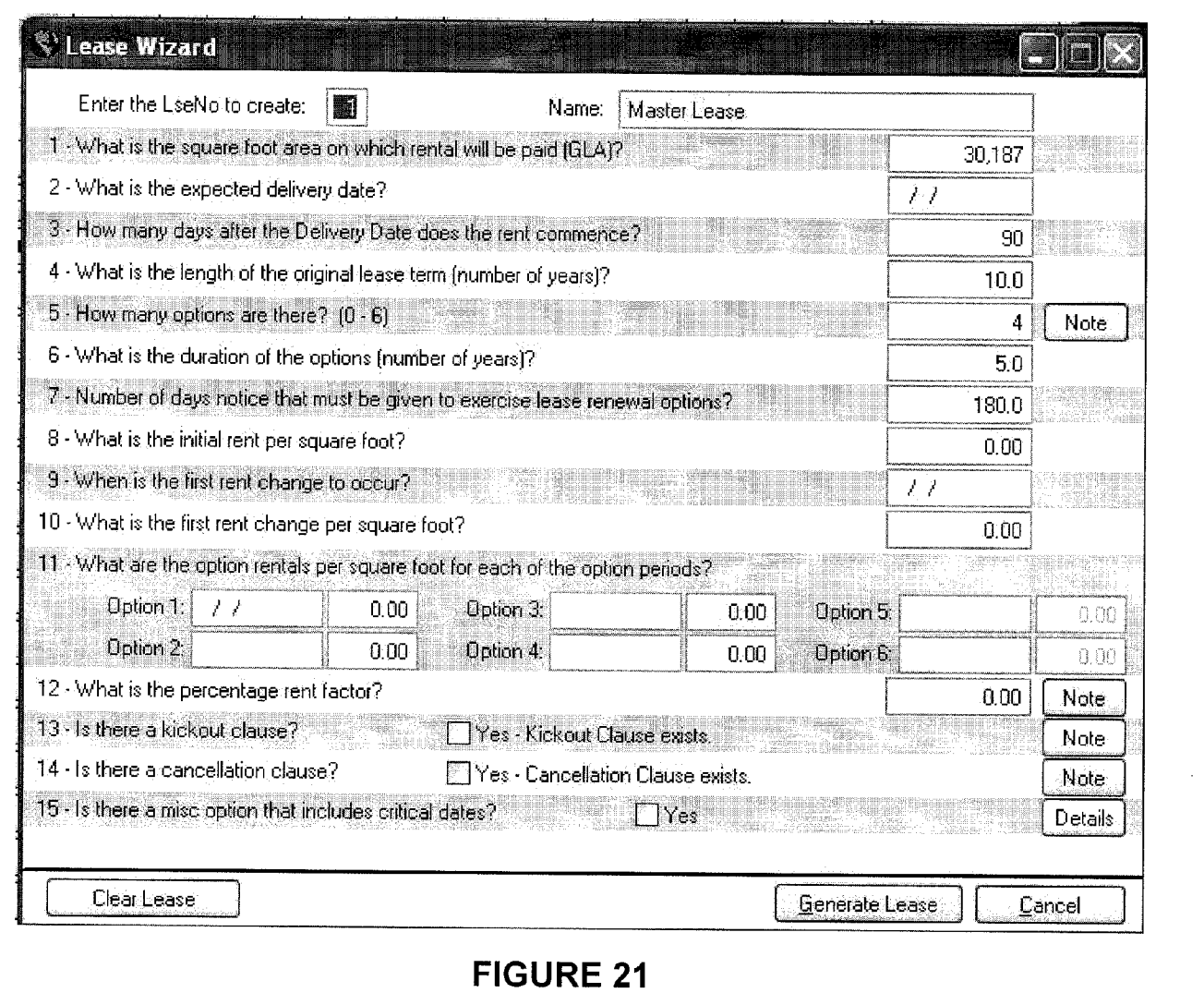
Figures 22, 23:
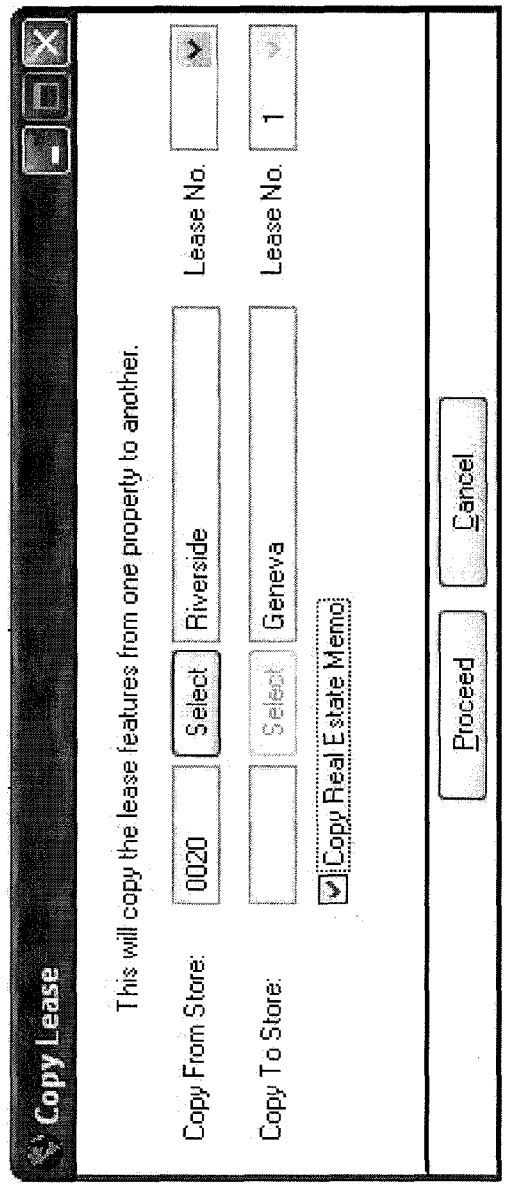
FIG. 22 illustrates an example of a rent stream and option summary screen of the deal tracking module of the real estate management system.
FIG. 23 illustrates an example of a copy lease screen of the deal tracking module of the real estate management system.

The deal tracking module may also include a "Lease Wizard" that, by answering a series of 15 questions (shown in FIG. 21), the system generates a lease abstract and populates all of the related fields in the database based on the answers to these questions. Examples of the questions include: When is the expected delivery date? How many options are there and what is the length of the option periods? As the answers to the 15 questions on the Lease Wizard screen shown in FIG. 21 are answered, the system populates date fields in the lease table and appends records to the rent stream and options tables. After the "Lease Wizard" runs, the rent stream and option records are displayed in the summary screen as shown in FIG. 22. The 'Rents' and 'Options' buttons may be used to manually adjust the records after the "Lease Wizard" has generated the lease abstract.

Copying Lease Features

If a new lease has similar lease features to an existing lease, a Copy Lease Feature screen (an example of which is shown in FIG. 23) may be used to copy all of the lease features from one lease abstract to a new lease abstract. Once copied, the 'Features' button may be used to manually updated each lease feature as needed.

Lease Summary Report

The end result of the Lease Wizard feature is that a Lease Summary or Abstract report (an example of a portion of it is shown in FIG. 24). Using the Lease Wizard tool, the first draft of the Lease Summary report may be generated in a matter of minutes.

In addition, previous leases that have been abstracted may be copied to the new lease abstract. Pages of lease feature text are easily copied into the new lease where they can be edited for just the changes rather than inputting the whole feature from scratch.

Deal Status

As the site progresses through each step of the real estate life-cycle, many data elements are updated and are displayed on a series of status reports. Items including the opening window, the lease status, the amount spent to date on legal fees, the construction status, the delivery date and the related liquidated damages are all tracked in the system.

Figure 25:
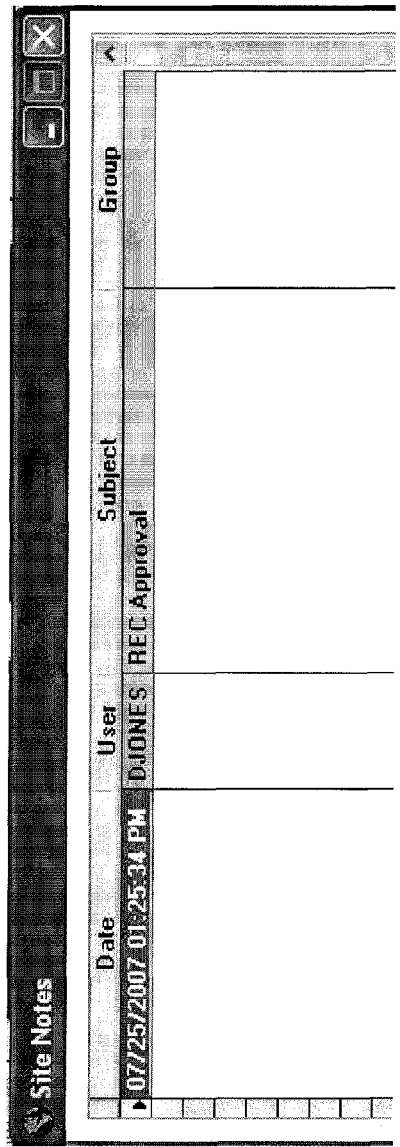
FIG. 25 illustrates an example of a site notes grid screen of the deal tracking module of the real estate management system.
Figure 26:
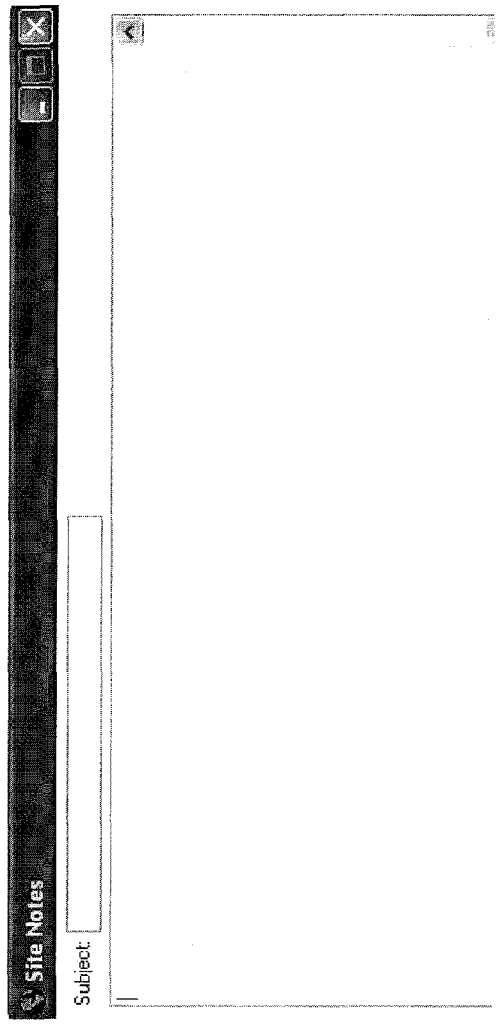
FIG. 26 illustrates an example of a site note input screen of the deal tracking module of the real estate management system.

As a deal progresses, conversation and transaction notes may be entered into a Deal Notes history for that site. The deal notes are attached to the site record and include the date, user adding the note and freeform comments. Related file attachments may be pasted into the note record. Thus, as certain events happen to a site record over the life of a site, notes are appended to the Site Notes grid (an example of which is shown in FIG. 25). Users may also add notes manually to the grid by clicking the 'Add' button. Double clicking on one of the rows of the grid, launches the text field as shown in FIG. 26 where the contents of the note may be read.

Noteworthy Events

In addition to adding notes manually to each site, the following events may automatically append a note to the site notes grid:

1—A site is added to the database.
2—Status Code changes.
3—A Broker adds recommendation comments to the site.
4—Letter of Intent is signed.
5—Site is approved by the Real Estate Committee; or
6—Lease is signed.

Real Estate Law Module

The real estate module may track real estate law aspects of the property.

Lease Development

The status of the development of each lease is tracked in the system. As new drafts of the lease are completed, the draft number, completed date and status notes are entered into the lease project record. The electronic file of the executed lease document and related documents are attached to the record, and they may be launched for viewing and updating.

Litigation Matters

The status of litigation matters is tracked and reported using one of the many preformatted legal reports. The system stores information concerning the litigating parties, outside counsel, claim amount and status, legal fees incurred to date and resolution status. A freeform notes field allows for a detailed history of each litigation matter.

Legal Costs Tracking

Each legal invoice is either entered or imported into the system. Invoices are attached to legal project records and accumulated to show the total life-of-matter costs for each project. Invoices are batched in an order to facilitate the approval process. Approved legal invoices are submitted electronically to Accounts Payable for payment processing. Having the legal costs associated to each legal project makes it easy to generate a variety of legal cost reports including average cost per lease, average legal cost per attorney, average cost per deal maker, capital costs verses legal expenses verses litigation costs, etc.

Document Management Module

The document management module of the real estate management system may manage the documents associated with the properties managed by the real estate management system.

Site Documents

A data grid listing all of the site related legal documents is attached to each site record. Clicking on a listing of one of the documents displayed in the grid launches the document maintenance screen that contains fields for document type, name, related parties, legal entity, etc.

View and Search Scanned Documents

Scanned documents converted to pdf files, Excel files or Word files may be attached to each document record. Clicking the 'View Document' button from the document maintenance screen launches the related application (i.e. Adobe Reader, Excel, Word, etc.). If the attached document is searchable, the search tools included with the related application may be used to locate certain phrases or text. Having scanned documents attached to the database can potentially save users a lot of time because they have the actual document at their finger tips.

Document Book Marking

For non-searchable documents, the document management module's book marking tool may be used to quickly navigate to certain sections or pages of large documents. In particular, 'Doc Link' buttons are placed on many of the screens found in the real estate management system. When a 'Doc Link' button is clicked, the attached document or file (i.e. Lease) is launched and the cursor lands on the previously defined page. For example, if the Maintenance and Repair clause of a lease is on page 54 of a lease, and if the user clicked the 'Doc Link' button on the maintenance and repair screen, the lease document would open and the cursor would land on page 54 of the lease.

Store Design Module

The Store Design module may be used by a department of an owner of the real estate management system, such as a store design department, to track certain documents and drawings that are required as part of designing and delivering a store. Data fields for due dates and dates received are populated and reported on the Store Design Status Report. Quick access to all of the development and construction contacts is also available on a Store Design screen.

Sign Package

Figure 27:
FIG. 27 illustrates an example of a sign display screen of the deal tracking module of the real estate management system.
Figure 28:
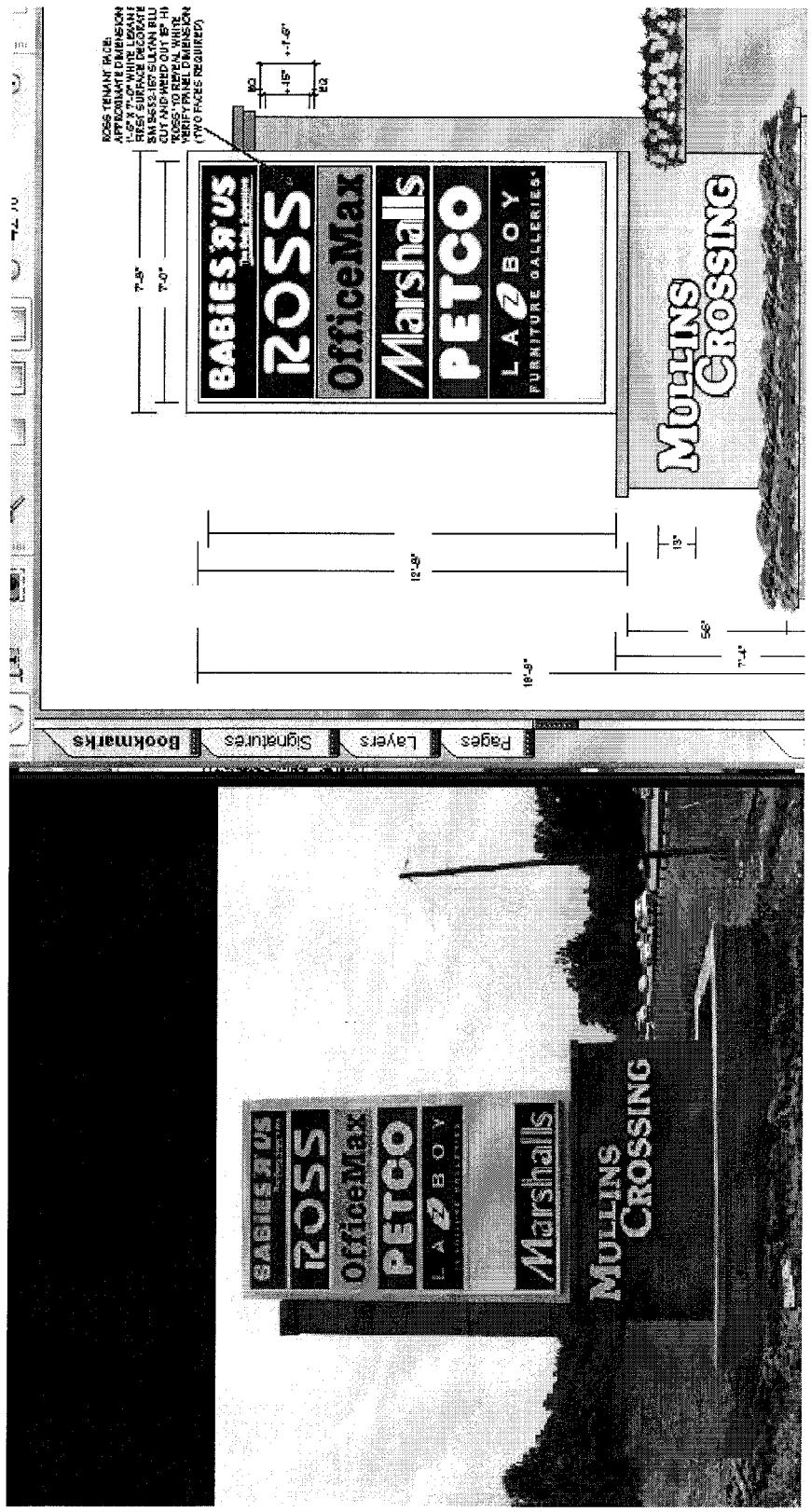
FIG. 28 illustrates another example of a sign display screen of the deal tracking module of the real estate management system.

The status of the store sign package is tracked in the Store Design Module and stored in the database 110 shown in FIG. 1. Fifteen critical task dates are tracked, including the due date and the completed date for each one as well as any associated comments. Drawings and photos of each sign are uploaded by non-employees of the company (the sign company personnel) and they are available for viewing and printing within the database 110. In more detail, sign drawings are prepared by non-employees (sign company personnel), converted to pdf files and loaded on to their network each day. In addition, the sign company's sub-contractors take photos of the installed signs at each store and email them to the sign company which in turn post them to their network along with drawings. On a nightly basis, a batch program runs that copies the photo and drawing files and transfers them to the database 110 via the Internet. The files that have been transferred are viewable within the real estate management application via a sign display screen (an example of which is shown in FIG. 27) wherein up to six photos or drawings may be viewed at a time. Clicking the back and forward buttons allows the user to scroll through all the thumbnail photos. Double clicking on a photo expands it so that it can be viewed using the size of the entire screen. A final sign photo can be compared to the original sign drawing by resizing the files and aligning them side by side as shown in FIG. 28 to match sign artwork with photos of the actually installed signs.

Construction Module

The construction module may generate a construction portal in which each authorized user (such as group of employees in a construction group of the owner of the real estate management system) has his or her own customizable portal. The portal displays lists of sites, outstanding projects, and critical dates and tasks.

Status Reports

Various status reports are generated that track over 50 attributes of sites that are under construction. The data on the reports are displayed in different colors depending on their status. Over due tasks are displayed in red.

Project Management

The construction project management module tracks the status of each task for all of the sites that are under construction. Major milestones are displayed in an easy to read format with color formatting that reflects the status of each milestone (i.e. tasks that are over due are highlighted in red). Automatic email reminders are sent to the responsible parties. Project tasks may be imported into the real estate property management system database directly from MS Project.

Punch List Management

The punch list manager displays a listing of open project tasks. Punch list data elements include the location, description, task type, responsible party, date created, priority, status, schedule to complete date and the date completed. As punch list items are completed, the project plan milestones are updated and reflected on the screens and reports.

Property Management Module

The property management module may track and store property management dates and actions to be taken.

Critical Dates

Critical dates and tasks that require action appear in each user's portal (an example of which is shown in FIG. 19). Email reminders are automatically sent to the assigned person and tasks continue to appear until they are completed. Certain pre-selected date fields within the database are reviewed and are displayed in the critical dates list when appropriate.

Business Contacts

An unlimited number of contacts may be attached to each site. Contacts are assigned a type such as landlord, manager, contractor, etc. Emails may be sent directly to the contact from within the system. Mailing labels and mail merge data sources are easily created from the contacts database.

Photo Gallery

Figure 29:
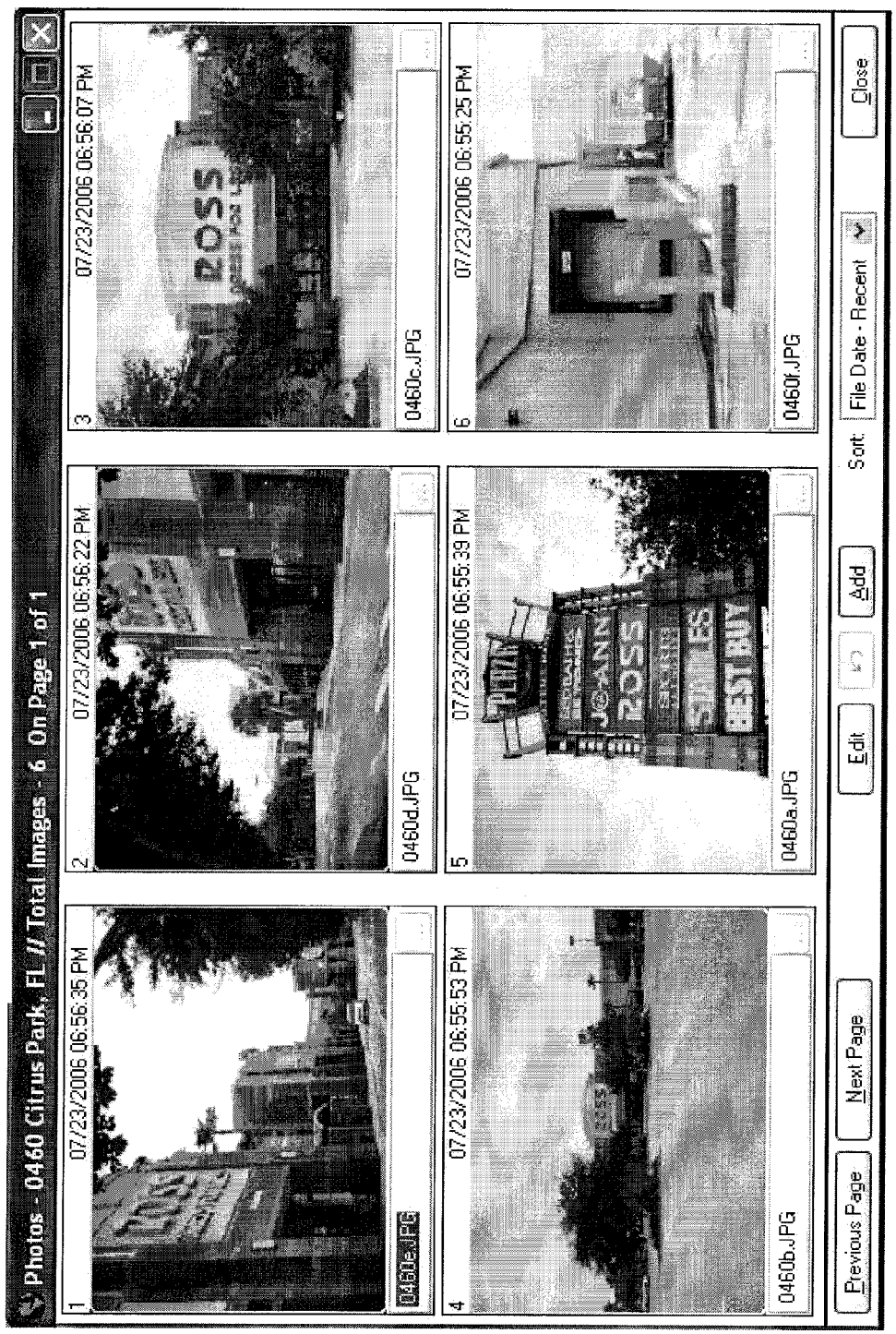
FIG. 29 illustrates an example of a photo display screen of the property management module of the real estate management system.

An unlimited number of photos may be attached to each site record. Clicking the photos button displays all of the photos in 'thumbnail' view, double clicking on a particular photo expands the image to the size of the screen where it can be modified and printed. In the thumbnail view, the images are initially displayed in thumbnail view six photos per page as shown in the example in FIG. 29. Clicking the 'Next Page' and 'Previous Page' buttons allows the user to scroll through and see all of the photos that have been attached to each facility (which can include stores, offices, warehouses and distribution centers). The thumbnail photos are automatically converted to low resolution images so that performance is optimized.

Printing Photos

Figure 30:
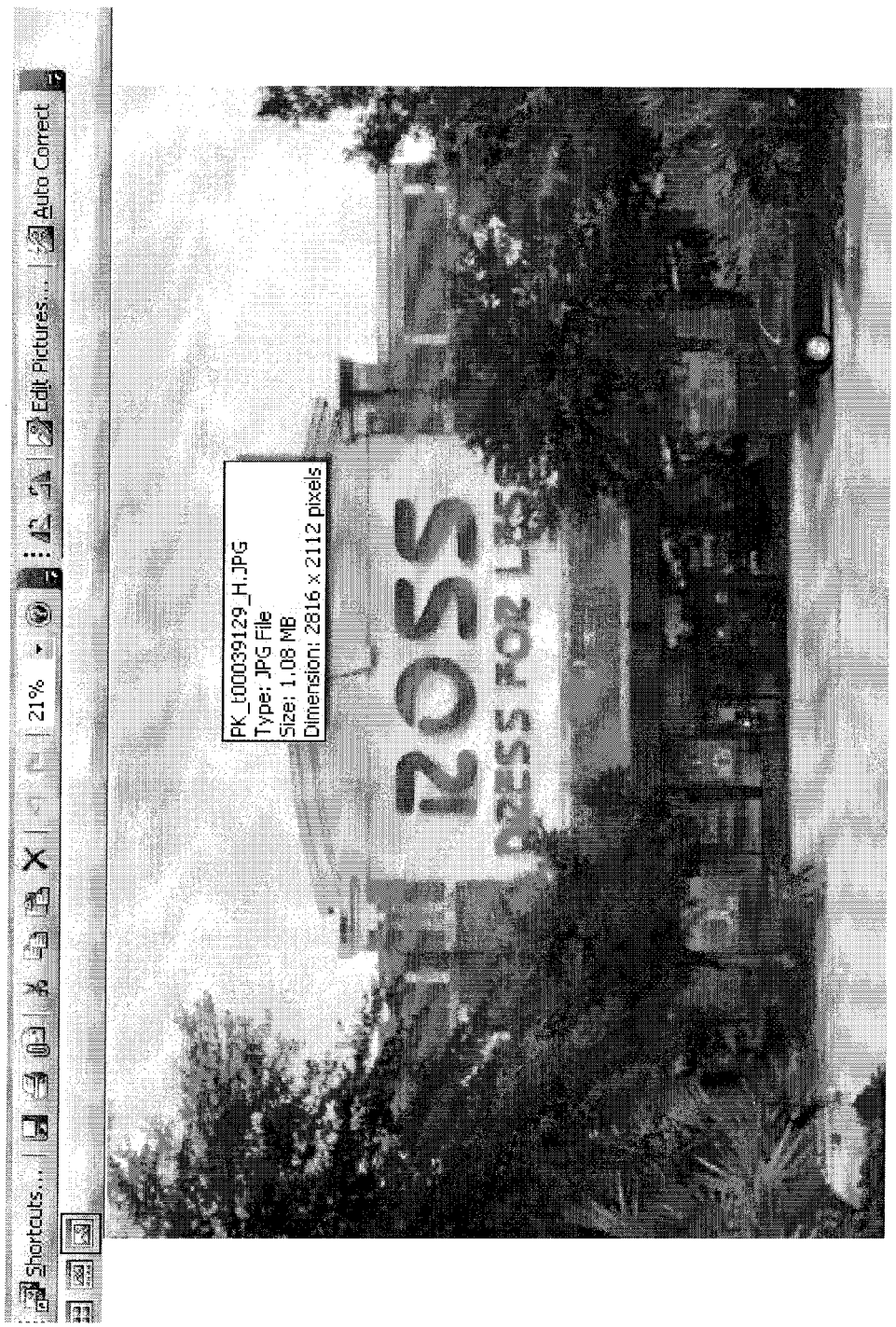
FIG. 30 illustrates an example of a photo printing screen of the property management module of the real estate management system.

Double clicking on a photo launches the photo enlarger screen where the image is converted to high resolution. Double clicking on the image again, launches the installed photo editor (i.e. Microsoft Office Picture Manager) as shown in FIG. 30. Once the photo editor is up, the image may be edited or printed using a third party tool.

Sales History/Trend

The sales history, store contribution and estimated or projected sales data are attached to each store record. Ratios such as percentage change from last year and sales per square foot are also displayed. Thus, clicking the Sales History button launches a screen shown in FIG. 31 that display annual sales, the percentage change from the prior year, the gross margin percentage, the contribution dollars and contribution as a percent of sales. The top row of the grid displays the estimated or projected sales for the current year and the month and year of when they were last updated. By entering a store number or site name in the 'Jump To Store Number/Name' box at the bottom of the screen, the user may quickly review the financial history of another store.

Cotenants

A listing of all cotenants is attached to each site. All changes to the cotenants are stored, and the owner's property manager is alerted when lease 'required' cotenants vacate the shopping center so that the lease may be reviewed for lease remedies in the event a required cotenant vacates its space in the shopping center.

Utilities

Utility bills are tracked in the system and include information regarding the provider, account number, deposit, bond, etc.

Insurance Certificates

An unlimited number of insurance policies may be attached to each site. Information regarding the insurance type, responsible party, coverage, etc. is maintained. Scanned copies of the insurance certificates are attached to each insurance record.

Lease Administration Module

The lease administration module may track and manage lease related information and tracks decisions related to the properties being managed by the real estate management system.

Landlords and Payees

Multiple landlords and payees may be attached to the record of each lease tracked by the system. The percentage of ownership feature ensures that each landlord or rent payee receives its proper share of rent and operating cost payments. The landlord company and address information is independent of the payee company and address information. The accounting system vendor ID number is stored as part of the rent payee record. The vendor name and address information is compared or validated against the accounting system's vendor table. Any discrepancies are noted and an email is generated and sent to the appropriate party so that the vendor information may be reconciled.

Lease Components—Rents, Options, Features

Maintenance screens for all of the components of a lease including rent stream, lease options, lease features and lease amendments exist in the system which facilitate the lease management process. An unlimited number of records may be added to each lease component. Once option exercise and renewal dates have been entered, tickler reports appear in the system, including on the appropriate user portal screen (FIG. 14), that alert users that certain actions must be taken. The lease administration module has the ability to manage multiple leases per site or store so calculating the number of open stores and active leases (for example) is an easy task.

Lease Summary

A preformatted lease summary report presents the abstracted lease information in an easy to read format. The lease summary report has sections for site information, landlord and other contacts, rent stream, lease options, lease amendments, lease features and maintenance and repair responsibilities.

FAS 13 Compliance

The lease administration module uses the rent stream and other lease information that it stores to generate financial information that is needed to meet Financial Accounting Standards Board (FASB) disclosure requirements. The future lease obligations, terms remaining, number of open stores, and capital versus operating lease analysis are all standard reports that make deriving these disclosures very easy. FASB requires that leases that meet certain criteria must be classified and accounted for as capital leases as opposed to operating leases. A following screen (FIG. 32) asks the user the four questions to determine the classification of a lease. If the answer to any of these questions is 'Yes', the lease is considered to be a capital lease and the status bar on the screen changes from Operating Lease to Capital Lease. The lease term, total rent payments and number of rent payments are used to calculate the present value of the rent stream and the fair market value of the assets.

Straight Line Rent

The lease administration module may calculate straight line rent and provides a corresponding report as required by FASB. The straight line rent screen gives users the ability to include rents in the calculation and to manipulate the commitment start and end dates. In more detail, clicking the box in the 'Used In SLR' column includes the related rent amounts in the straight line rent calculations as shown in FIG. 33. The user may change the commitment start and end dates to recalculate the number of months to use in the denominator. Key dates including the delivery and opening date are displayed on the left hand side of the screen for easy reference. The fields on the right hand side of the screen are used to reconcile the straight line rent calculation with the company's general ledger. The general ledger balance may be imported in and compared to the straight line rent amount calculated by the system. The difference is calculated and displayed and a journal entry report is generated so that the difference may be booked to the general ledger.

Rent Roll and Operating Costs

Once the rent payment information has been loaded into the system, generating the monthly rent roll is a very easy task. Payees, rent payments and operating cost payments are pulled into a rent schedule report. A reconciliation report is generated that compares the current rent schedule to any prior rent schedule and highlights all payee and amount changes. Once the rent roll is reconciled, the batch is saved and transmitted to the Company's Accounts Payable system. Rent checks are automatically generated using the Rent Roll batch file and disbursed to payees. Check information including the check number, date, check amount and distribution amount are returned to the real estate property management system and posted to the check request record. This allows users to query the real estate property management system and not the Accounts Payable system to obtain invoice payment information when answering vendor calls.

Percent Rents Module

The percent rents module manages monthly sales and sales report letters and percentage rent letters.

Monthly Sales and Sales Letters

Monthly sales are imported from the Company's accounting system. The table driven sales definitions make it easy to calculate 'reportable sales' because certain discounts and adjustments may be deducted from gross sales. Each store may have a different formula for calculating reportable sales and the percent rents module is flexible enough to handle all of these different calculations. Multiple 'Report To' contacts may be stored and attached to each store record. Preformatted sales report letters are generated and electronically faxed or emailed to the appropriate landlords and 'Report To' contacts.

Percentage Rent Report and Payment Transmittal Letters

The Percentage Rent module calculates percentage rent payments and generates the corresponding percentage rent report and payment transmittal letters. Flexible sales definitions allow the gross sales to be adjusted to lease defined adjusted sales amounts. Deductions may be made for property taxes paid or for any other lease defined adjustment including real property taxes paid. Percentage rent payments may be calculated on a natural break point or by using several other predefined calculation methods. The calculated amount is compared against previously made payments and a check request or credit memo may be generated for the net amount.

Property Taxes Module

Real Property Taxes

The property tax module has tables for jurisdictions, parcels, valuations and estimates. A variety of reports are available that facilitate the property tax management process.

Appeals

As assessed values are appealed, the status of the appeal is tracked in the property tax module and stored in the real estate management system database. Any savings resulting from the appeal are also entered, and the savings are added to a "Property Management Accumulated Savings" record total.

Parcels

Tax parcels numbers are attached to each site record. The parcel finder screen makes it easy to locate a specific parcel based on facility (which can include stores, offices, warehouses and distribution centers) number, jurisdiction, parcel number, etc. As assessed values are received, they are posted to the parcel record for each year. The parcel valuation comparison report provides a tool to review valuations, and valuations that change either a significant percentage or amount from the prior year are highlighted.

Expense Audit Module

The expense audit module performs audit related functions.

Letter Generator

As billings are received from landlords, letters requesting supporting documents are generated by the system. Data is exported from the database and placed into a MS Word document. The Word document letter may be further edited by the user prior to sending it to the Landlord.

Three preformatted letters may be generated including a documents request letter, deferred payment letter and audit findings letter.

Line Level Detail

Each detail line of the landlord billing is entered into a reconciliation worksheet for that facility. The detail lines may be copied quickly from a previous billing for the current facility or from a previous billing from another facility. Each detail line item is compared to a prior billing amount. Each line may have its own pro-rata share, management fee, tax rate, etc. Adjustments and explanations for reduced or disallowed expenditures are entered for each line and the related savings are displayed and accumulated as the reconciliation is performed.

Reconciliation

At the conclusion of the audit process, the Company's adjusted amount due is compared against payments previously made against the current landlord billing. All the previous payments made are displayed and they may be dragged over and matched against the current reconciliation. A preformatted report is generated that displays the reconciliation in detail complete with explanations for all adjustments made and credits taken. If an additional amount is due, a check request is automatically generated. If a credit is due to the landlord, a credit memo is generated and the user is asked to take the credit against future billings or against future rent payments.

Field Audit

The full functionality of the Expense Audit module is available to be downloaded onto a laptop computer for field audit purposes. Users may check out certain facilities from the database that will be audited away from the Company's corporate office. Users may then perform audits "off-line" by entering items into the laptop version. When the user returns to the office, the data in the laptop is uploaded and synchronized with the Company's corporate database.

Savings

A major objective of the Expense Audit module is to generate cost "savings" by reviewing and reconciling landlord billings in detail. The system has several built-in saving calculations including line item comparison against prior billings, management fees, pro-rata share, tax rate, maximum caps, etc. Several preformatted savings reports may be generated to show the amount of savings generated by facility, by year, by reconciliation type or by auditor.

Facility Maintenance Module

The facility maintenance module handles and organizes various aspects of the physical management of a facility on the property.

Facilities Call Center—Work Order Management

Work orders are submitted for the various stores into the Company's Facilities Call Center where they are subsequently sent to maintenance vendors so that the work may be completed. Several screens are generated by the facility maintenance module to facilitate the management of these work orders. For example, various screens display open work orders, pending work orders, work orders by store, work orders by vendor, work orders by problem type, etc.

Responsible Party

The maintenance and repairs (M&R) matrix (an example of the user interface is shown in FIG. 34) lists each major client defined repair category and who is responsible for repairing, maintaining and replacing the items in each category. The responsible party is selected from a pick list that includes options for the Company, Landlord or Manufacturer. A hot link button links the M&R screen to the maintenance and repair section of the lease document so that users may quickly reference the lease while determining responsibilities. The M&R Responsibility Matrix lists over 30 predefined maintenance categories and the responsible party for each. As maintenance issues arise, users can reference this matrix to quickly determine the responsible party. The specific details related to each M&R type may be added to the free form notes section of the detail screen as shown in FIG. 35. This screen is launched by double clicking one of the rows on the M&R Matrix screen.

Floor Plans

Figure 36:
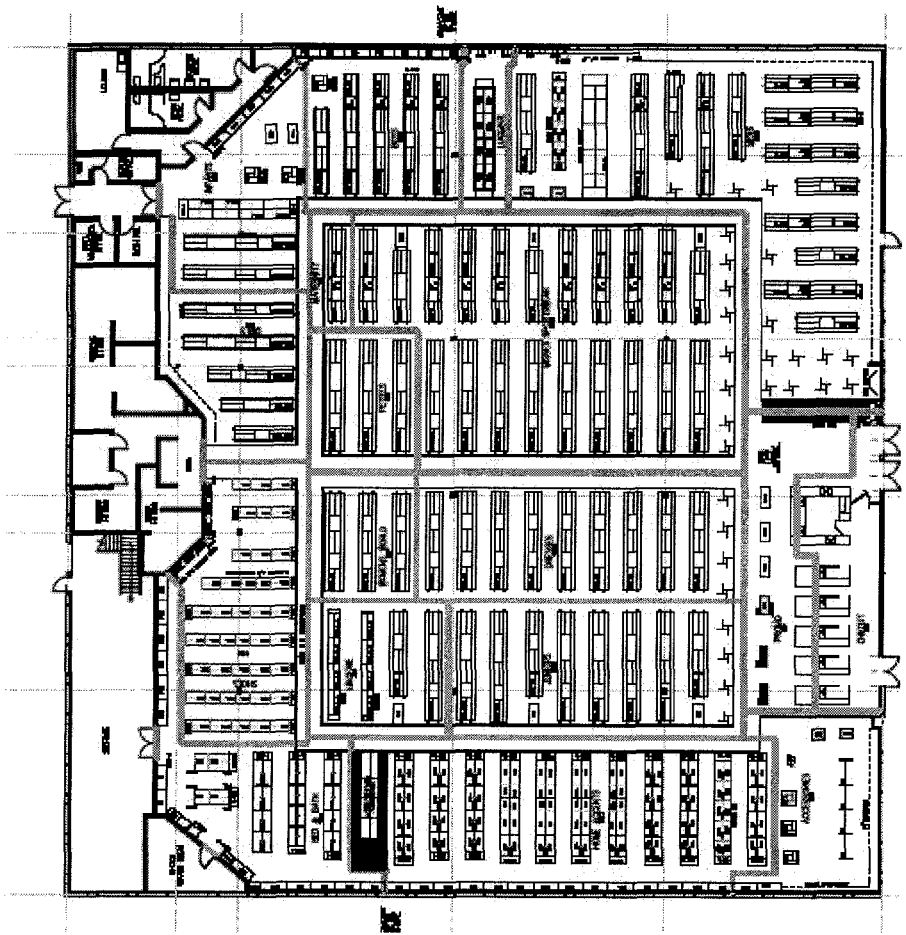
FIG. 36 illustrates an example of a floor plan screen of a facility management module of the real estate management system.

The floor plans for each store have been created and attached to the record for each store. An example of a floor plan is shown in FIG. 36. A PDF copy of a CAD drawing of each store's floor plan is attached to the record for each store. As PDF files, each user is able to launch the drawings and view them using Adobe Reader software. Users can zoom in and out of the drawing, copy and paste sections of the drawing, and send the sections of the floor plan to contractors to further explain the store area that needs to be repaired.

Work Orders—Purchase Order Interface

After work orders are received and entered into the real estate management database, a request for purchase orders is made by the system to the Company's purchase order system. Purchase order numbers are generated and returned and posted to the work order records. As invoices are received from the contractors, Accounts Payable personnel match the invoices with the previously assigned purchase orders and the invoices are automatically submitted for processing. Check payment information is returned to the real estate management system and posted to the work order record. This allows a facilities' coordinators to quickly respond to vendor inquiries as they only have to access the real estate management system to retrieve the answers.

Work Orders—Store Level Access

Figure 37:
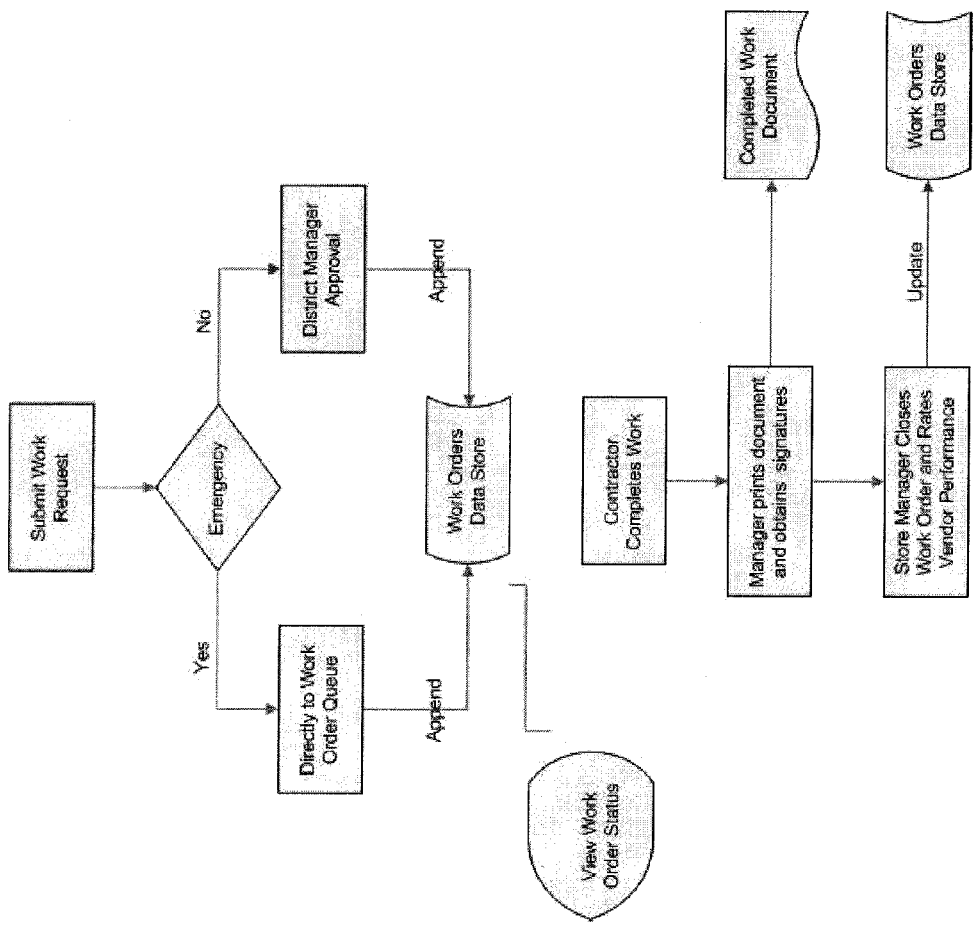
FIG. 37 illustrates an example of a store level work order process flow of a facility management module of the real estate management system.

Store managers may submit work requests via a web page. These work requests are queued for their district managers for approval and, when approved, are queued for the Facilities Call Center where they are distributed to maintenance contractors by the facility coordinators. Store managers are able to access the work order database to view the status of each work order and to close out each work order after the work has been completed. An example of store level process flow is shown in FIG. 37.

Access to Work Order Database

A link on each Store's Information System Portal launches a login screen as shown in FIG. 38. The store and district manager user ID's are maintained in the real estate management system's user's table. Store Managers are presented with a listing of all of their store's open work orders and all work orders that have been closed within the last 60 days.

District managers are presented with a listing of open work orders and those closed within the last 60 days for all of his or her stores.

Work Order Finder

When a user logs on to the work order system, they are presented with the Work Order Finder screen as shown in FIG. 39. The Finder has columns for Store Number, Work Order Date, Work Order Number, Problem Type, Vendor Name, Status Code, Completed Date, Work Order Type and Purchase Order Number. Clicking on the column headings resorts the data alternating between ascending and descending order by the data in the current columns Double clicking on one of the rows, launches the detail work order screen. The top portion of the Finder screen may be used to further filter the work order data set. The data may be filtered by Store Number, Status Code, Work Order Number, Problem Type, Work Order Type, Vendor Name, Work Order Date and Purchase Order Number.

Submitting Work Requests

Clicking the Add button on the Work Order Finder screen launches the Work Request screen shown in FIG. 40. When a work request is submitted, a record is appended to the work order table but the status code is set to 'REQUEST'. Once the District Manager approves the work request, the status changes to 'PENDING' and the record is queued for the assigned Facility Coordinator for processing by the Facilities department. Facilities approves the work order and the status becomes 'Open/Authorized'. Once the work is done and the work order is closed, the status becomes 'Closed/Completed'.

Work Order Detail Screen

Figure 41:
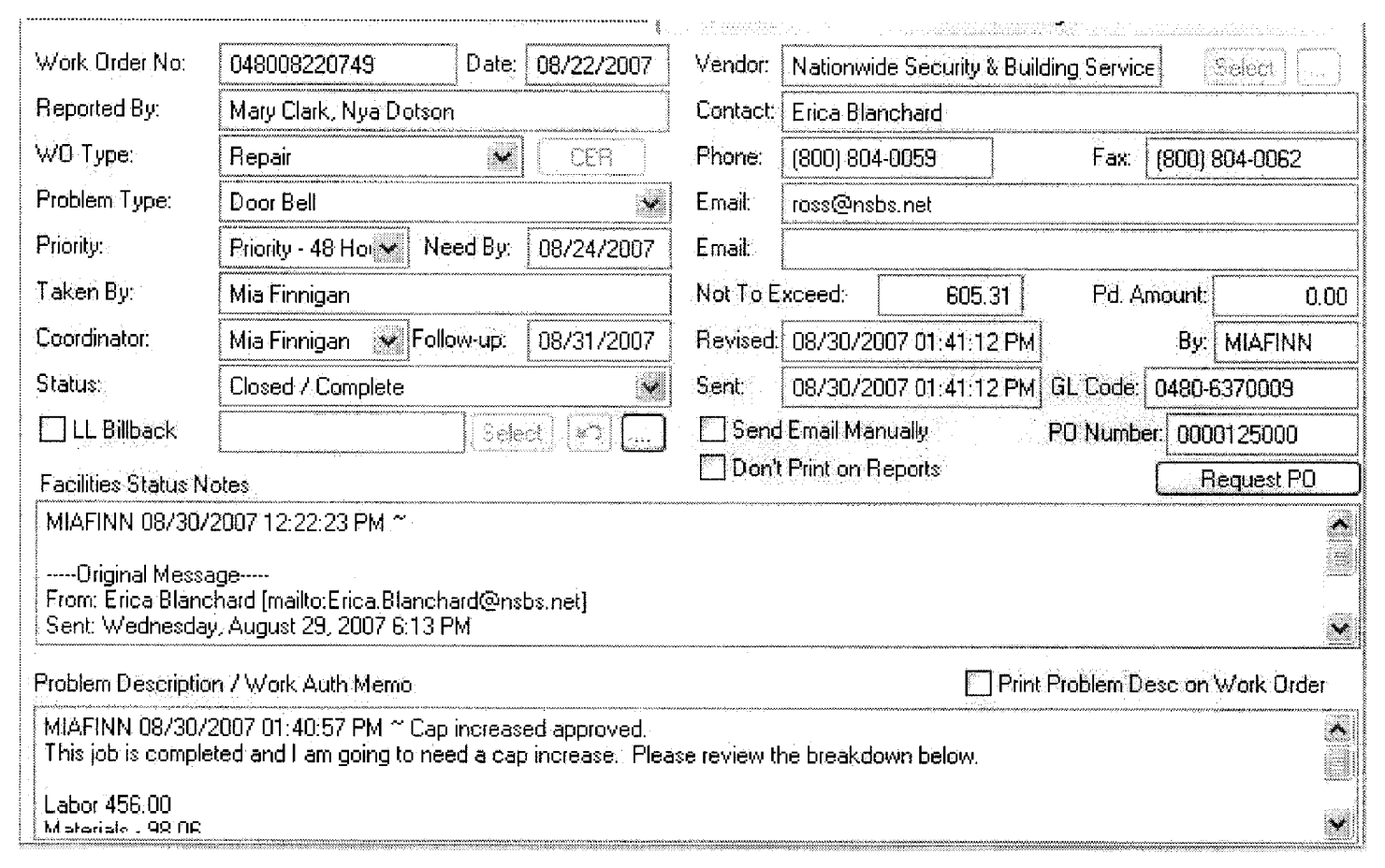

The details of the work order are displayed via a screen such that shown in FIG. 41. The problem type, status and vendor information are presented. The problem description is displayed in an edit box and all notes entered by the Facilities Coordinators are shown.

Closing Out Work Orders

To close out a work order the store manager accesses the screen shown in FIG. 42, prints out the 'Completed Work Document' and changes the status of the work order to 'Complete'. The store manager may rank the vendor's performance on a scale of 1 to 10 with 10 being excellent and 1 being poor. The rankings entered by all of the managers for each vendor are polled and used to generate vendor performance reports at the corporate level.

Landlord Bill Backs

If a certain repair item is determined to be the Landlord's responsibility, the system may be set-up to generate a series of letters intended to notify the Landlord of its responsibility to repair the item. The status of the repair is tracked, and a preformatted letter is generated that may be sent to the Landlord at each stage of the repair process. If the company pays for a repair that is the Landlord's responsibility, the user is directed to take this amount as a credit against future rents and a corresponding letter is generated.

Sublease Administration Module

The sublease administration modules handles subleases for properties under management by the real estate management system.

Subleases

Multiple subleases may be attached to each lease or site. The sublease screen has a grid that lists all of the attached subleases. Each sublease shows the associated subtenant, the current sublease rent, square footage and rent per square foot aligned next to the rent and square footage of the associated site or lease. Component screens for rents, options, features, costs and improvements allow the sublease to be easily abstracted and managed.

Invoices and Receivables

The sublease rent roll generates monthly invoices and billing statements that may be electronically sent to the subtenants. As rent payments are received, they are posted against the associated invoice. Accounts receivable ageing reports are easily generated from the fully functional billing and receivables system.

Surplus Properties

The square footage of each surplus property is tracked against the square footage of each associated sublease. The surplus property report lists the surplus property square footage and the occupancy or vacancy percentage.

Report and Infrastructure Module

The report and infrastructure module performs various reporting functions of the real estate management system.

Standard Reports

The real estate management system contains over 300 standard reports. These reports range from simple store listings to complex management reports with intelligent colors and graphics. The standard reports are generated using report parameter screens where the report results may be filtered using a number of parameters. All standard reports may be displayed to the screen, directed to any attached printer, downloaded to an Excel file or converted to a PDF file using the real estate property management system pdf writer function.

Figure 43:
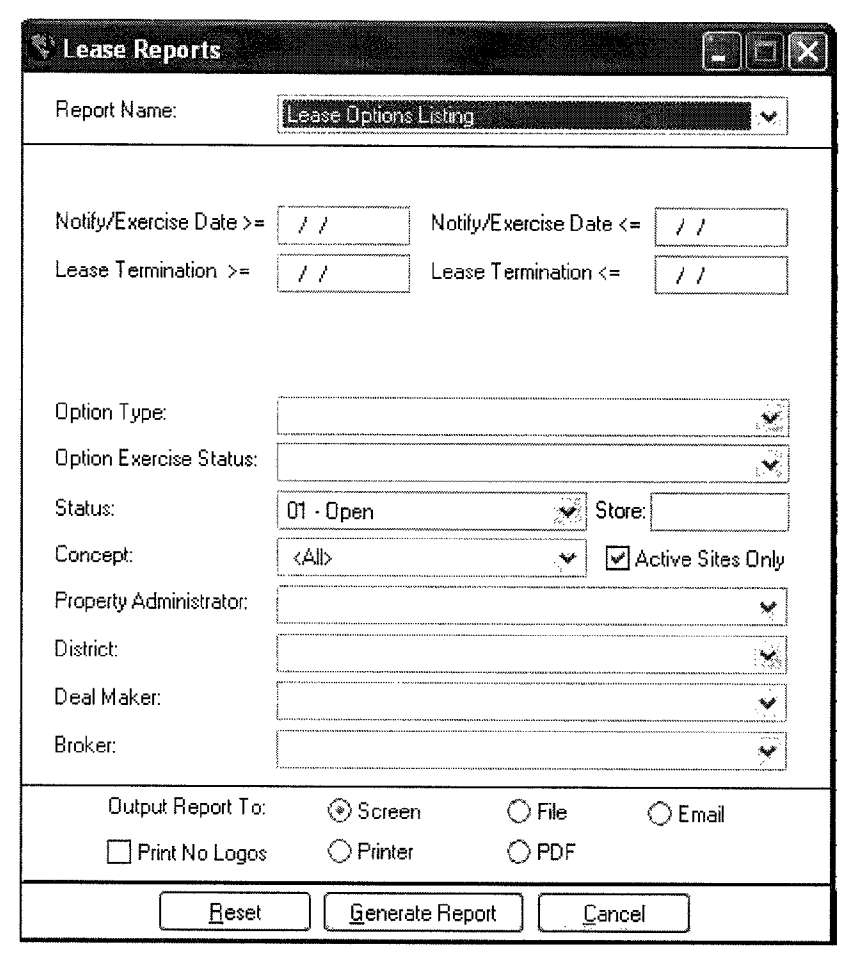

The standard reports are generated using report parameter screens as shown in FIG. 43. If a user does not have access to generate and print a report, the report does not appear in the report option drop down list. As different reports are selected from the drop down list, the parameter fields change to only show the applicable report filters. Each report may be displayed on the screen, sent to an attached printer, downloaded to an Excel file, converted to a PDF file or converted to a PDF file and automatically attached to an email.

Query Tool

A query tool has been included that may be used to create simple listing reports. Access to the query tool is given to certain authorized users. These users may select fields from various tables and arrange them on a spreadsheet like report writer. The query results may be downloaded to Excel and the queries created may be saved so that other users may access them and generate the same query results.

Figure 44:
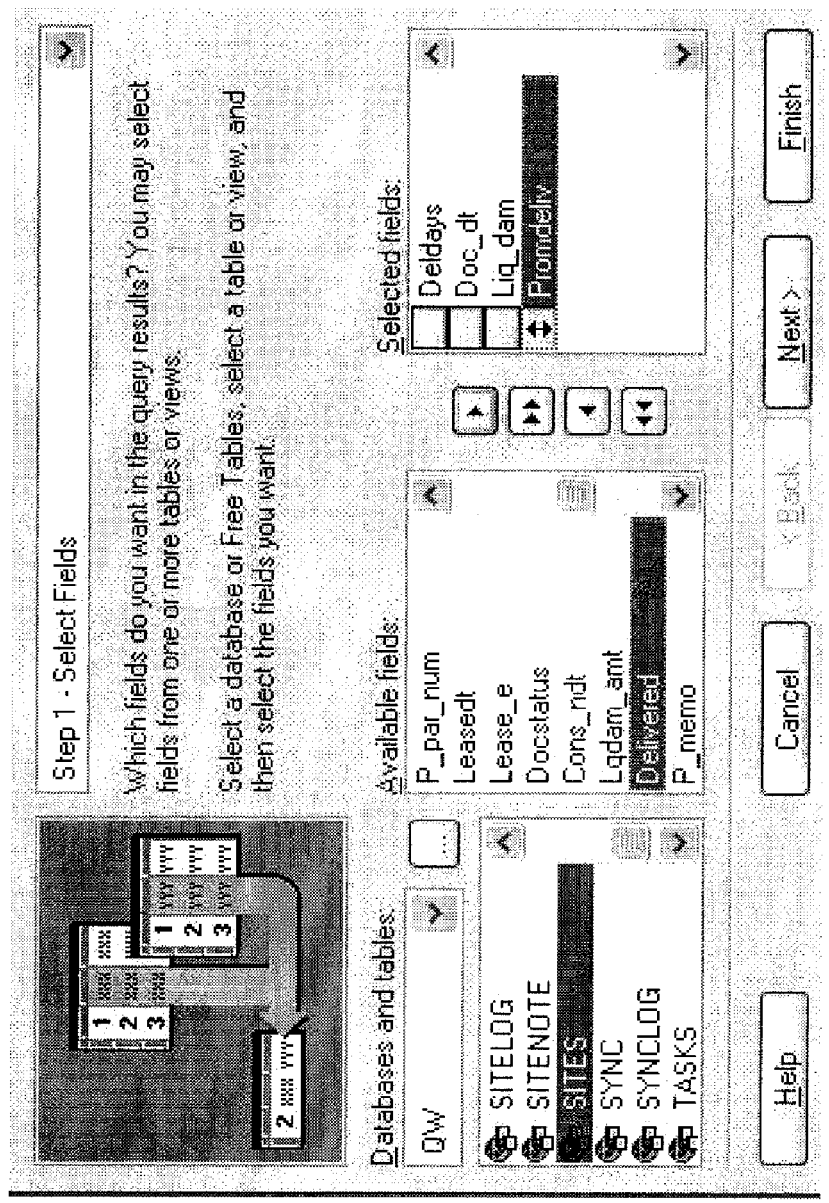
FIG. 44 illustrates an example of a select fields user interface screen of the real estate management system.
Figure 45:
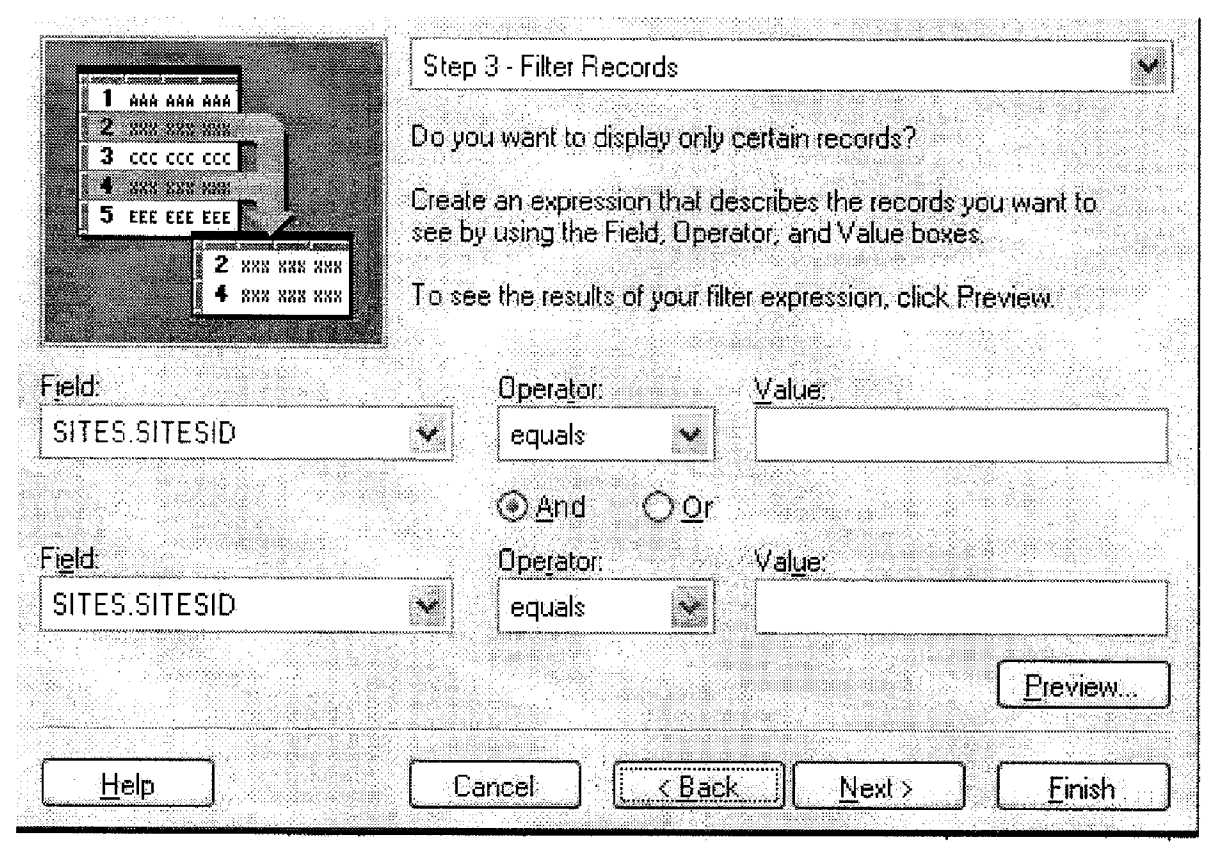

The query tool may include a report query wizard. Using the query tool wizard screens, a simple listing report can be generated in a matter of minutes. A screen (an example of which is shown in FIG. 44) is used to select which fields are to be presented on the report. All tables and fields, except those with high security access levels, are available to drag on to a report. The second and third wizard screens (See FIG. 45) ask the user if he/she wants to filter the report based on the fields previously selected and to define the sort order of the query.

The query may be previewed during any step of the development cycle. Once the query report has been generated, it may be saved as a query file and other users may have access to generate the same query report.

Crystal Reports

Users who have expertise with the popular Crystal Reports report writer tool may access the real estate management system database and create powerful and complex reports. Using Crystal Reports, tables may be joined to create a variety of form and listing reports. Complex graphics and charts may also be added to the reports.

Custom Report Writer

In addition to the reporting options listed above, the real estate management system has a user friendly report writer used to create quick Excel reports. The data dictionary is used to convert complex field and table names into user friendly names. For example, a user may selected a field called Lease Area Square Footage rather than the real field name of x_sqftrent. Over 150 common fields have been converted to these user friendly names so that users can quickly select them and create a useful Excel report.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A method for managing real estate using a computer implemented real estate management unit and a storage unit connected to the real estate management unit, the method comprising:

storing, in a storage unit, data associated with the real estate management unit and a plurality of site records and each site record contains data about a property being managed for an owner using the real estate management unit;

storing, in the storage unit, a plurality of new property items;

generating, by a site storage module of the real estate management unit, a record in a database that includes the new property items and the plurality of properties of the owner being managed using the real estate management unit that are currently occupied, to be opened and to be closed within the next five years;

managing, using a store design module of the real estate management unit, for each property of the owner being managed by the real estate management unit, one or more sign assets associated with each property of the owner being managed using the real estate management unit;

displaying, by the store design module of the real estate management unit, drawings and artwork of the one or more sign assets to be built on each property and photos of the completed one or more sign assets on each property;

comparing, using a user interface of the store design module of the real estate management unit, the drawings and artwork of the sign asset to the photo of the completed sign asset;

managing, using a lease administration module of the real estate management unit, for each property of the owner being managed using the real estate management unit, one or more leases associated with the property of the owner being managed using the real estate management unit; and managing, using a facilities maintenance module of the real estate management unit for each property of the owner being managed using the real estate management unit, one or more work orders for repair and maintenance associated with each property being managed using the real estate management unit.

2. The method of claim 1 further comprising generating, by a pin map module of the site selection module of the real estate management unit, a map that illustrates the location of each new property item and the plurality of properties being managed using the real estate management unit and each new property item has a first color pin on the map and the plurality of properties being managed using the real estate management unit have a second color pin on the map.

3. The method of claim 2, wherein generating the map further comprising generating, by the pin map module of the site selection module of the real estate management unit, a map with pins that shows the location of one or more stores of a competitor.

4. The method of claim 1 further comprising using one or more computing devices to access the real estate management unit over a communications link and generating, by the site selection module, a display of the record in the database that is downloaded over the communications link to the one or more computing devices.

5. The method of claim 1 further comprising capturing, by a sign package of the store design module, one or more sign assets for each property being managed using the real estate management unit, storing the one or more sign assets in the storage unit and displaying a sign gallery of the one or more sign assets associated with each property being managed using the real estate management unit.

6. The method of claim 1 further comprising generating, by a lease wizard of the lease administration module for a property being managed using the real estate management unit, a lease abstract for the property being managed using the real estate management unit.

7. The method of claim 1 further comprising managing, by a work order module of the facilities maintenance module for each property being managed using the real estate management unit, a plurality of work orders associated with repair or maintenance of each property being managed using the real estate management unit.

* * * * *